(12) United States Patent
Berkley et al.

(10) Patent No.: US 11,182,230 B2
(45) Date of Patent: Nov. 23, 2021

(54) SYSTEMS AND METHODS FOR REDUCING ERRORS IN CALIBRATED DEVICES

(71) Applicant: D-WAVE SYSTEMS INC., Burnaby (CA)

(72) Inventors: Andrew J. Berkley, Vancouver (CA); Richard G. Harris, Vancouver (CA)

(73) Assignee: D-WAVE SYSTEMS INC., Burnaby (CA)

( * ) Notice: Subject to any disclaimer, the term of this patent is extended or adjusted under 35 U.S.C. 154(b) by 65 days.

(21) Appl. No.: 16/702,096

(22) Filed: Dec. 3, 2019

(65) Prior Publication Data

US 2020/0183768 A1 Jun. 11, 2020

Related U.S. Application Data

(60) Provisional application No. 62/777,989, filed on Dec. 11, 2018.

(51) Int. Cl.
*G06F 11/00* (2006.01)

(52) U.S. Cl.
CPC ........ *G06F 11/004* (2013.01); *G06F 2201/81* (2013.01)

(58) Field of Classification Search
CPC .... G06F 11/004; G06F 2201/81; G06N 10/00
See application file for complete search history.

(56) References Cited

U.S. PATENT DOCUMENTS

| 10,872,021 B1* | 12/2020 | Tezak | G06N 10/00 |
| 2019/0392352 A1* | 12/2019 | Lampert | G06F 17/18 |

OTHER PUBLICATIONS

Bunyk et al., "Architectural Considerations in the Design of a Superconducting Quantum Annealing Processor," IEEE Trans. Appl. Supercond., 24, arXiv:1401.5504v1 [quant-ph] Jan. 21, 2014, 9 pages.
D-Wave, "Technical Description of the D-Wave Quantum Processing Unit", D-Wave User Manual 09-1109A-M, Sep. 24, 2018, 56 pages.
Whittaker, J.D., et al., "A frequency and sensitivity tunable microresonator array for high-speed quantum," arXiv:1509.05811v2 [quant-ph], Apr. 22, 2016, 8 pages.
Amin, M.H. S, et al., "First Order Quantum Phase Transition in Adiabatic Quantum Computation", arXiv:0904.1387v3, Dec. 15, 2009, 5 pages.
Amin , et al., Macroscopic Resonant Tunneling in the Presence of Low Frequency Noise, arXiv:0712.0845 [cond-mat.mes-hall], May 13, 2008,4 pages.

(Continued)

*Primary Examiner* — Joseph R Kudirka
(74) *Attorney, Agent, or Firm* — Cozen O'Connor

(57) ABSTRACT

Methods for reducing errors in calibrated devices comprise detecting outliers, self-checking consistency of measurements, tuning device controls to target values, and absolutely calibrating devices via a first standard and cross-checking the results via a second standard. The first standard may be a calibrated current and the second calibration standard may be a calibrated frequency. A calibrated frequency may be a microwave signal applied to the body of a qubit. Qubit annealing controls can quickly lower and raise the tunnel barrier to measures the oscillation frequency of the qubit between two potential wells.

14 Claims, 12 Drawing Sheets

(56) References Cited

OTHER PUBLICATIONS

Berkley, A. J., et al., "Tunneling spectroscopy using a probe qubit", arXiv:1210.6310v2 [cond-mat.supr-con] Jan. 3, 2013, 5 pages.

Gao, Jiansong, "The Physics of Superconducting Microwave Resonators," Thesis, In Partial Fulfillment of the Requirements for the Degree of Doctor of Philosophy, California Institute of Technology Pasadena, California, May 28, 2008, 197 pages.

Harris, et al., "Probing Noise in Flux Qubits via Macroscopic Resonant Tunneling", arXiv:0712.0838v2 [cond-mat.mes-hall], Feb. 8, 2008, 4 pages.

King, Andrew D., et al., "Observation of topological phenomena in a programmable lattice of 1,800 qubits", arXiv:1803.02047 [quant-ph], Mar. 6, 2018, 17 pages.

Lanting, T., "Observation of Co-tunneling in Pairs of Coupled Flux Qubits", arXiv:1006.0028v1 [cond-mat.supr-con], May 31, 2010, 4 pages.

Lanting, T., et al., "Geometrical dependence of the low-frequency noise in superconducting flux qubits", Physical Review B, 79, 060509, Jun. 5, 2009, 4 pages.

Lanting, T., et al., "Probing High Frequency Noise with Macroscopic Resonant Tunneling", arXiv:1103.1931v1 [cond-matsupr-con], Mar. 20, 2011, 5 pages.

Manucharyan, Vladimir E., et al., "Fluxonium: single Cooper pair circuit free of charge offsets", arXiv:0906.0831v2, [cond-mat.mes-hall] Oct. 20, 2009, 13 pages.

Sete, Eyob A., et al., "A Functional Architecture for Scalable Quantum Computing", 2016 IEEE International Conference on Rebooting Computing (ICRC), Oct. 17, 2016, 5 pages.

Swenson, L. J., et al., "Operation of a titanium nitride superconducting microresonator detector in the nonlinear regime", arXiv:1305.4281 v1 [cond-mat.supr-con], May 18, 2013, 11 pages.

Van Harlingen, D. J., et al., "Decoherence in Josephson-junction qubits due to critical current fluctuations", arXiv:cond-mat/0404307v1 [cond-mat.supr-con], Apr. 13, 2004, 24 pages.

\* cited by examiner

SYSTEMS AND METHODS FOR REDUCING ERRORS IN CALIBRATED DEVICES

FIELD

This disclosure generally relates to systems and methods to reduce errors during and after absolute calibration processes.

BACKGROUND

Quantum Devices

Quantum devices are structures in which quantum mechanical effects are observable. Quantum devices include circuits in which current transport is dominated by quantum mechanical effects. Such devices include spintronics, and superconducting circuits. Both spin and superconductivity are quantum mechanical phenomena. Quantum devices can be used for measurement instruments, in computing machinery, and the like.

Quantum Annealing

Quantum annealing is a computational method that may be used to find a low-energy state of a system, typically preferably the ground state of the system. Similar in concept to classical simulated annealing, the method relies on the underlying principle that natural systems tend towards lower energy states because lower energy states are more stable. While classical annealing uses classical thermal fluctuations to guide a system to a low-energy state, quantum annealing may use quantum effects, such as quantum tunneling, as a source of delocalization to reach an energy minimum more accurately and/or more quickly than classical annealing.

A quantum processor may be designed to perform quantum annealing and/or adiabatic quantum computation. An evolution Hamiltonian can be constructed that is proportional to the sum of a first term proportional to a problem Hamiltonian and a second term proportional to a delocalization Hamiltonian, as follows:

$$H_E \propto A(t)H_P + B(t)H_D$$

where $H_E$ is the evolution Hamiltonian, $H_P$ is the problem Hamiltonian, $H_D$ is the delocalization Hamiltonian, and $A(t)$, $B(t)$ are coefficients that can control the rate of evolution, and typically lie in the range [0,1].

In some implementations, a time varying envelope function can be placed on the problem Hamiltonian. A suitable delocalization Hamiltonian is given by:

$$H_D \propto -\frac{1}{2}\sum_{i=1}^{N} \Delta_i \sigma_i^x$$

where N represents the number of qubits, $\sigma_i^x$ is the Pauli x-matrix for the ith qubit and $\Delta_i$ is the single qubit tunnel splitting induced in the $i^{th}$ qubit. Here, the $\sigma_i^x$ terms are examples of "off-diagonal" terms.

A common problem Hamiltonian includes a first component proportional to diagonal single qubit terms and a second component proportional to diagonal multi-qubit terms, and may be of the following form:

$$H_P \propto -\varepsilon/2\left[\sum_{i=1}^{N} h_i \sigma_i^z + \sum_{j>i}^{N} J_{ij}\sigma_i^z \sigma_j^z\right]$$

where N represents the number of qubits, $\sigma_i^z$ is the Pauli z-matrix for the $i^{th}$ qubit, $h_i$ and $J_{ij}$ are dimensionless local fields for the qubits, and couplings between qubits, and $\varepsilon$ is some characteristic energy scale for $H_P$.

Here, the $\sigma_i^z$ and $\sigma_i^z \sigma_j^z$ terms are examples of "diagonal" terms. The former is a single qubit term and the latter a two-qubit term.

Throughout this specification, the terms "problem Hamiltonian" and "final Hamiltonian" are used interchangeably unless the context dictates otherwise. Certain states of the quantum processor are, energetically preferred, or simply preferred by the problem Hamiltonian. These include the ground states but may include excited states.

Hamiltonians such as $H_D$ and $H_P$ in the above two equations, respectively, may be physically realized in a variety of different ways. A particular example is realized by an implementation of superconducting qubits.

Quantum Processor Architecture

A quantum processor is any computer processor that is designed to leverage at least one quantum mechanical phenomenon (such as superposition, entanglement, tunneling, etc.) in the processing of quantum information. Regardless of the specific hardware implementation, all quantum processors encode and manipulate quantum information in quantum mechanical objects or devices called quantum bits, or "qubits;" all quantum processors employ structures or devices for communicating information between qubits; and all quantum processors employ structures or devices for reading out a state of at least one qubit. A quantum processor may include a large number (e.g., hundreds, thousands, millions, etc.) of programmable elements, including but not limited to: qubits, couplers, readout devices, latching devices (e.g., quantum flux parametron latching circuits), shift registers, digital-to-analog converters, and/or demultiplexer trees, as well as programmable sub-components of these elements such as programmable sub-components for correcting device variations (e.g., inductance tuners, capacitance tuners, etc.), programmable sub-components for compensating unwanted signal drift, and so on.

Among the large number of programmable elements of a quantum processor, there are inevitably: a) discrepancies between theoretical design specifications and the actual physical parameters of real, manufactured devices; and/or b) incongruences between nominally identical devices. For this reason, a quantum processor typically requires at least some calibration before operation. Calibrating the elements of a quantum processor may involve, for example, applying signals to the processor elements; measuring responses, behaviors, and/or parameters that depend on the applied signals; and using the results of the measurements to influence how signals are applied to the processor during subsequent operation. For example, a processor element may be theoretically designed to produce a specific response when programmed with a signal of magnitude X, but due to a discrepancy between the theoretical design specifications and the actual physical parameters of the real, manufactured device, the processor element may be found to produce the specific response when programmed with a signal of magnitude (X+dx). Similarly, two programmable elements in a quantum processor may be theoretically designed to behave in the same way in response to a globally applied signal, but due to an incongruence in the fabrication of the two elements their behaviors may diverge. Calibrating the elements of a quantum processor may detect such incongruences and inform their correction by, for example, the application of element-specific static bias signals. The calibration of the elements of a quantum processor is a challenging and time-consuming task that can involve the collection and analysis of very large amounts of data. In principle, each individual programmable element and potentially the pairwise interactions between programmable elements may need to be characterized. Accordingly, the art of quantum computing will benefit from systems and methods for improving the calibration procedures for quantum processors.

The foregoing examples of the related art and limitations related thereto are intended to be illustrative and not exclusive. Other limitations of the related art will become apparent to those of skill in the art upon a reading of the specification and a study of the drawings.

BRIEF SUMMARY

There exists a need to be able to process at least some problems having size and/or connectivity greater than (and/or at least not fully provided by) the working graph of an analog processor. Computational systems and methods are described which, at least in some implementations, allow for the computation of at least some problem graphs which have representations which do not fit within the working graph of an analog processor (e.g. because they require more computation devices and/or more/other couplers than the processor provides).

A method for reducing errors in a hybrid processor system is described. The hybrid processor system including a first processor and a second processor, the second processor comprising a plurality of calibrated devices, each calibrated device having at least one determinable parameter, and a programming interface communicatively coupled to the plurality of devices. The method may be summarized as including: for each of a number of the calibrated devices, obtaining a respective value for the at least one determinable parameter for each calibrated device via the first processor; and calculating a first measure for the at least one determinable parameter from the respective values obtained for each calibrated device via the first processor; determining if any of the calibrated devices are outlier devices via the first processor; and programming the second processor via the programming interface to disregard outlier devices.

Calculating a first measure for the at least one determinable parameter may include calculating a median value for the at least one determinable parameter and determining if any of the calibrated devices are outlier devices may include determining which calibrated devices have a respective value for the at least one determinable parameter more than three standard deviations away from the median value.

The method may further include selecting a set of calibrated devices in the plurality of calibrated devices via the first processor before obtaining a respective value for the at least one determinable parameter for each calibrated device in the set of devices. Obtaining a respective value for the at least one determinable parameter for each calibrated device may include obtaining a respective value for the at least one determinable parameter for each calibrated qubit; determining if any of the calibrated devices are outlier devices may include determining if any of the calibrated devices are outlier qubits; and programming the second processor via the programming interface to disregard outlier devices may include programming a quantum processor via the programming interface to disregard outlier qubits.

Obtaining a respective value for the at least one determinable parameter for each calibrated qubit may include obtaining a respective value selected from a group comprising: electric moment, magnetic moment, and low energy quantum eigenspectrum spacing.

A method for reducing errors in a hybrid computing system is described. The hybrid computing system may include a first processor and a second processor, the second processor comprising a plurality of devices, at least one device in the plurality of devices communicatively coupled to at least one other device in the plurality of devices via a coupling device, each coupling device having at least one determinable parameter, and a programming interface communicatively coupled to the plurality of devices. The method may be summarized as including: applying a calibration signal to the at least one other device in the second processor via the first processor; reading out a second value of the determinable parameter of the coupling device; and comparing the first and the second values of the determinable parameter of the coupling device via the first processor to define an absolute calibration bound.

Applying a calibration signal to the least one device in the second processor via the first processor may include applying a calibration signal to the least one qubit in a quantum processor via a digital processor; reading out a first value of a determinable parameter of the coupling device may include reading out a first value of a mutual inductance of the coupling device; applying a calibration signal to the at least one other device in the second processor via the first processor may include applying a calibration signal to the at least one other qubit in the quantum processor via the digital processor; reading out a second value of the determinable parameter of the coupling device may include reading out a second value of the mutual inductance of the coupling device; comparing the first and the second values of the determinable parameter of the coupling device via the first processor to define an absolute calibration bound may include comparing the first and the second values of the mutual inductance of the coupling device via the digital processor to define an absolute calibration bound.

A method for reducing error in a hybrid processor system is described. The hybrid processor system may include a first processor and a second processor, the second processor comprising a plurality of devices, at least one device in the plurality of devices communicatively coupled to at least one other device via a coupling device, each coupling device having at least one determinable parameter, and a programming interface communicatively coupled to the plurality of devices. The method may be summarized as including: iteratively repeating until a respective first and second value of the least one determinable parameter of every coupling devices has been obtained: selecting an $i^{th}$ device via the first processor; identifying all coupling devices communicatively coupled to the $i^{th}$ device via the first processor; applying a calibration signal to the $i^{th}$ device via the first processor; obtaining a respective value of the at least one determinable parameter of every coupling device communicatively coupled to the $i^{th}$ device; and using the first and second value of the at least one determinable parameter to determine if any of the devices are outlier devices via the first processor.

Selecting an $i^{th}$ device via the first processor may include selecting an $i^{th}$ qubit via a digital processor, identifying all coupling devices communicatively coupled to the $i^{th}$ device via the first processor may include identifying all coupling devices inductively coupled to the $i^{th}$ qubit via the digital processor, applying a calibration signal to the $i^{th}$ device via the first processor may include applying a calibration signal to the $i^{th}$ qubit via the digital processor, obtaining a respective value of the at least one determinable parameter of every coupling device communicatively coupled to the $i^{th}$ device may include obtaining a respective value of the mutual inductance of every coupling device inductively coupled to the $i^{th}$ qubit, and using the first and second value of the at least one determinable parameter to determine if any of the devices are outlier devices via the first processor may include using the first and second value of the mutual inductance to determine which of the devices are outlier qubits, if any of the devices are outlier devices, via the digital processor.

A method for reducing errors in a hybrid processor system is described. The hybrid processor system may include a first processor and a second processor, the second processor comprising a plurality of devices, each device in the plurality of devices having at least one determinable parameter, and a programming interface communicatively coupled to the plurality of devices. The method may be summarized as including: applying a calibration signal to a first device via the first processor; reading out a first value of a determinable parameter of the first device, wherein the first value depends on the calibration signal applied to the first device; applying the calibration signal to a second device via the first processor, wherein the second device is communicatively coupled to the first device; reading out a first value of the determinable parameter of the second device, wherein the first value depends on the calibration signal applied to the second device; reading out a second value of the determinable parameter of the first device, wherein the second value depends on the calibration signal applied to the second device; applying the calibration signal to the first device via the first processor; reading out a second value of the determinable parameter of the second device, wherein the second value depends on the calibration signal applied to the first device; calculating a first measure from the first and the second values of the determinable parameter of the first device; calculating a respective first measure from the first and the second values of the determinable parameter of the second device; and programming the first and the second device via the programming interface using the respective first measures of the determinable parameter of the first and second device.

Applying a calibration signal to a first device via the first processor may include applying a calibration signal to a first qubit via a digital processor; reading out a first value of a determinable parameter of the first device, wherein the first value depends on the calibration signal applied to the first device may include reading out a first value of a determinable parameter of the first qubit, wherein the first value depends on the calibration signal applied to the first qubit; applying the calibration signal to a second device via the first processor, wherein the second device is communicatively coupled to the first device includes applying the calibration signal to a second qubit via the digital processor, wherein the second qubit is communicatively coupled to the first qubit; reading out a first value of the determinable parameter of the second device, wherein the first value depends on the calibration signal applied to the second device may include reading out a first value of the determinable parameter of the second qubit, wherein the first value depends on the calibration signal applied to the second qubit; reading out a second value of the determinable parameter of the first device, wherein the second value depends on the calibration signal applied to the second device may include reading out a second value of the determinable parameter of the first qubit, wherein the second value depends on the calibration signal applied to the second qubit; applying the calibration signal to the first device via the first processor may include applying the calibration signal to the first qubit via the first processor; reading out a second value of the determinable parameter of the second device, wherein the second value depends on the calibration signal applied to the first device may include reading out a second value of the determinable parameter of the second qubit, wherein the second value depends on the calibration signal applied to the first qubit; calculating a first measure from the first and the second values of the determinable parameter of the first device may include averaging the first and the second values of the determinable parameter of the first qubit to obtain an averaged value of the determinable parameter of the first qubit; calculating a respective first measure from the first and the second values of the determinable parameter of the second devices may include averaging the first and the second values of the determinable parameter of the second qubit to obtain an averaged value of the determinable parameter of the second qubit; and programming the first and the second device via the programming interface using the respective first measures of the determinable parameter of the first and second device may include programming the first and the second qubit via the programming interface using the respective averaged values of the determinable parameter of the first and second qubit.

Reading out a first value of a determinable parameter of the first qubit may include measuring a first value of a determinable parameter of the first qubit selected from a group comprising: electric moment, magnetic moment, and low energy quantum eigenspectrum spacing; reading out a first value of the determinable parameter of the second qubit may include measuring a first value of the determinable parameter of the second qubit selected from a group comprising: electric moment, magnetic moment, and low energy quantum eigenspectrum spacing; reading out a second value of the determinable parameter of the first qubit may include measuring a second value of the determinable parameter of the first qubit selected from a group comprising: electric moment, magnetic moment, and low energy quantum eigenspectrum spacing; reading out a second value of the determinable parameter of the second qubit may include measuring a second value of the determinable parameter of the second qubit selected from a group comprising: electric moment, magnetic moment, and low energy quantum eigenspectrum spacing; averaging the first and the second values of the determinable parameter of the first qubit to obtain an averaged value of the determinable parameter of the first qubit may include averaging the first and the second values of the determinable parameter of the first qubit selected from a group comprising: electric moment, magnetic moment, and low energy quantum eigenspectrum spacing to obtain an averaged value of the determinable parameter of the first qubit selected from a group comprising: electric moment, magnetic moment, and low energy quantum eigenspectrum spacing; averaging the first and the second values of the determinable parameter of the second qubit to obtain an averaged value of the determinable parameter of the second qubit may include averaging the first and the second values of the determinable parameter of the second qubit selected from a group comprising: electric moment, magnetic moment, and low energy quantum eigenspectrum spacing to obtain an averaged value of the determinable parameter of the second qubit selected from a group comprising: electric moment, magnetic moment, and low energy quantum eigenspectrum spacing; and programming the first and the second qubit via the programming interface using the respective averaged values of the determinable parameter of the first and second qubit may include programming the first and the second qubit via the programming interface using the respective averaged values of the determinable parameter of the first and second qubit selected from a group comprising: electric moment, magnetic moment, and low energy quantum eigenspectrum spacing.

A method for homogenizing devices in a hybrid processor system is described. The hybrid processor system may include a first processor and second processor, the second processor comprising a plurality of calibrated devices, each device in the plurality of calibrated devices having at least one determinable parameter, the at least one determinable parameter tunable via a parameter control system. The method may be summarized as including: selecting a set of devices in the plurality of calibrated devices in the second processor via the first processor; selecting a target value for the at least one determinable parameter for each device in the set of calibrated devices via the first processor; and tuning a respective parameter control system for the at least one determinable parameter for each device in the set of calibrated devices until it matches its respective target value.

Selecting a set of devices in the plurality of calibrated devices in the second processor via the first processor may include selecting a set of qubits in the plurality of calibrated qubits in a quantum processor via a digital processor; selecting a target value for the at least one determinable parameter for each device in the set of calibrated devices via the first processor may include selecting a target value for the at least one determinable parameter for each qubit in the set of calibrated qubits via the digital processor; tuning a respective parameter control system for the at least one determinable parameter for each device in the set of calibrated devices until it matches its respective target value may include tuning a respective parameter control system for the at least one determinable parameter for each qubit in the set of calibrated qubits until it matches its respective target value.

Selecting a set of qubits in the plurality of calibrated qubits may include selecting a set of qubits in the plurality of calibrated qubits according to a grouping based on one of: electrical coupling to signal lines, and proximity to a region in the processor.

A method for homogenizing devices in a hybrid processor system is described. The hybrid processor system may include a first processor and second processor, the second processor comprising a plurality of calibrated devices, each device in the plurality of calibrated devices having at least one determinable parameter, the at least one determinable parameter tunable via a parameter control system, wherein devices are communicatively coupled to each other according to a coupling architecture. The method may be summarized as including: selecting a first device in the second processor via the first processor; identifying all devices that are communicatively coupled to the first device via the first processor; and tuning a respective parameter control system for the at least one determinable parameter for each device communicatively coupled to the first device until the value of the respective parameter control system matches the value of the at least one determinable parameter of the first device.

Selecting a first device in the second processor via the first processor may include selecting a first qubit in a quantum processor via a digital processor; identifying all devices that are communicatively coupled to the first device via the first processor may include identifying all qubits that are communicatively coupled to the first qubits via the digital processor; and tuning a respective parameter control system for the at least one determinable parameter for each device communicatively coupled to the first device until its value matches the value of the at least one determinable parameter of the first device may include tuning a respective parameter control system for the at least one determinable parameter for each qubit communicatively coupled to the first qubit until its value matches the value of the at least one determinable parameter of the first qubit.

The method may further include iterating until all devices in the plurality of calibrated devices have been selected: selecting an $i^{th}$ device; identifying all devices that are communicatively coupled to the $i^{th}$ device; and tuning a respective parameter control system for the at least one determinable parameter for each device communicatively coupled to the $i^{th}$ device until its value matches the value of the at least one determinable parameter of the $i^{th}$ device.

A method for balancing devices in a hybrid processor system is described. The hybrid processor system may include a first processor and a second processor, the second processor comprising a plurality of devices, each device in the plurality of devices having at least one determinable parameter, the at least one determinable parameter tunable via a parameter control system. The method may be summarized as including: selecting a target value for the at least one determinable parameter via the first processor; selecting a target value for the at least one determinable parameter via the first processor; tuning the at least one determinable parameter of the first device to the target value; measuring a set of responses of the first device, the set of responses depended on the target value; and tuning a respective parameter control system for each device in the plurality of devices so that a respective set of measured responses of each device in the plurality of devices matches the set of responses of the first device.

Selecting a first device in the plurality of devices in the second processor via the first processor may include selecting a first qubit in the plurality of qubits in a quantum processor via a digital processor; tuning the at least one determinable parameter of the first device to the target value may include tuning the at least one determinable parameter of the first qubit to the target value; measuring a set of responses of the first device may include measuring a set of responses of the first qubit; and tuning a respective parameter control system for each device in the plurality of devices so that a respective set of measured responses of each device in the plurality of devices matches the set of responses of the first device may include tuning a respective parameter control system for each qubit in the plurality of qubits so that a respective set of measured responses of each qubit in the plurality of qubits matches the set of responses of the first qubit.

selecting a target value for the at least one determinable parameter may include selecting a target value for at least one of the following parameters: inductance, critical current, Josephson junction offset, compound Josephson junction offset.

Measuring a set of responses of the first qubits may include measuring at set of responses from a group comprising: circulating current, delta at varying CII biases.

A method for reducing errors in a hybrid processor system is described. The hybrid processor system may include a first processor and second processor, the second processor comprising a plurality of devices, each device in the plurality of devices having at least one determinable parameter, and a programming interface communicatively coupled to the plurality of devices. The method may be summarized as including: absolutely calibrating the at least one determinable parameter of the at least one device in the plurality of devices using a first calibration standard via the first processor; and cross-checking the absolute calibration of the at least one determinable parameter using a second calibration standard via the first processor.

absolutely calibrating the at least one determinable parameter of the at least one device in the plurality of devices using a first calibration standard via the first processor includes absolutely calibrating the at least one determinable parameter of the at least one qubit in the plurality of qubits using a first calibration standard via a digital processor.

Absolutely calibrating the at least one determinable parameter of the at least one qubit in the plurality of qubits using a first calibration standard may include absolutely calibrating the at least one determinable parameter of the at least one qubit in the plurality of qubits using a calibrated current, and cross-checking the absolute calibration of the at least one determinable parameter using a second calibration standard may include cross-checking the absolute calibration of the at least one determinable parameter using a calibrated frequency.

Cross-checking the absolute calibration of the at least one determinable parameter using a calibrated frequency may include applying a microwave signal to the body of the at least one qubit.

Cross-checking the absolute calibration of the at least one determinable parameter using a calibrated frequency may include initializing the at least one qubit in one potential well; lowering the tunnel barrier of the at least one qubit via the programming interface; and raising the tunnel barrier of the at least one qubit via the programming interface.

Lowering the tunnel barrier of the at least one qubit via the programming interface includes lowering the tunnel barrier of the at least one qubit via qubit annealing controls and raising the tunnel barrier of the at least one qubit via the programming interface may include raising the tunnel barrier of the at least one qubit via qubit annealing controls.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
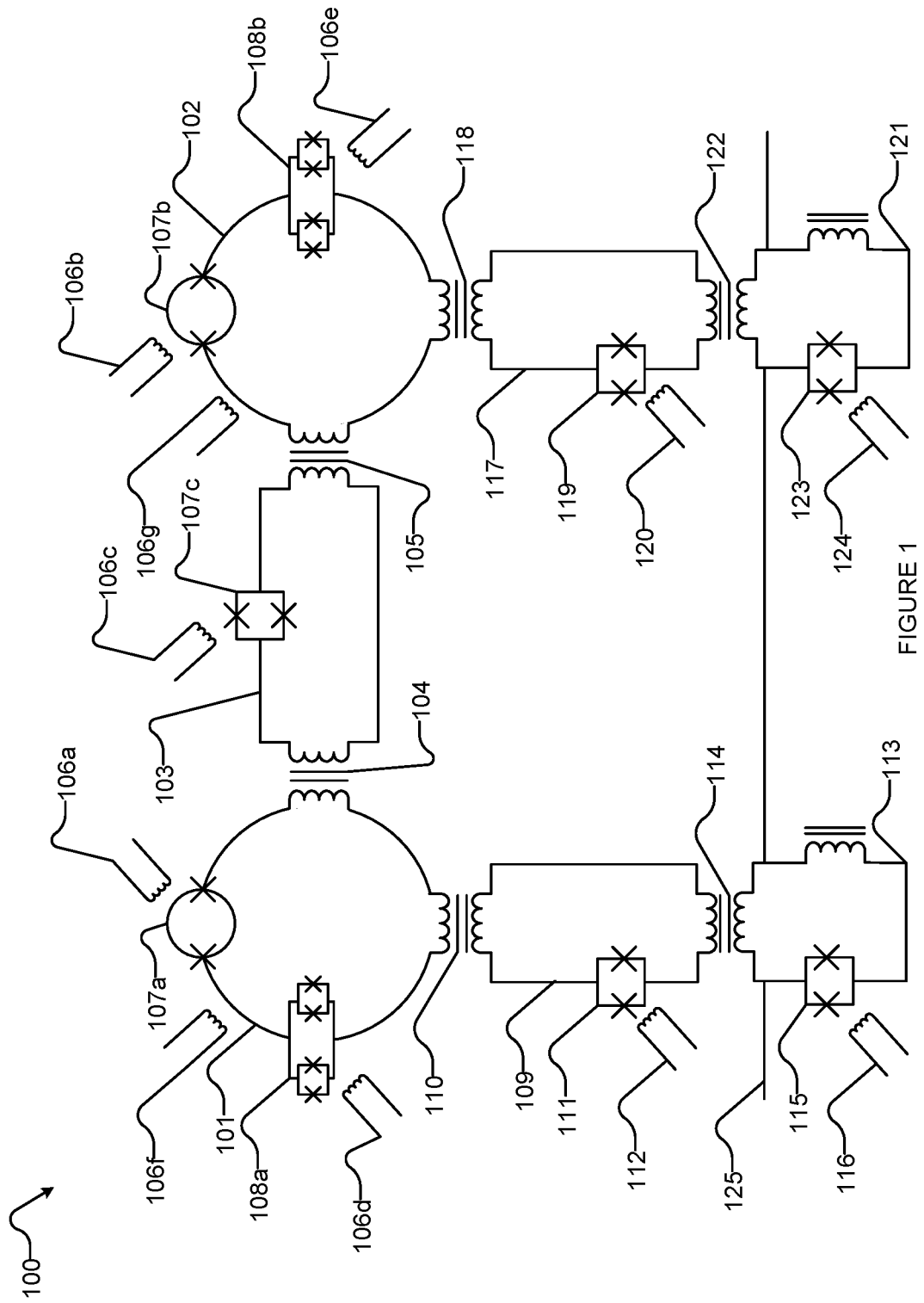
FIG. 1 is a schematic diagram of a portion of an example quantum processor including flux qubits coupled to each other.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Throughout this specification and the appended claims, the term 'match', 'matches' means having the same value within a predetermined error range.

Throughout this specification and the appended claims, the term 'homogenizing' two or more devices means adjusting the parameters of two or more devices to be equal within a desired accuracy.

Throughout this specification and the appended claims, the term 'balancing' devices means rendering some behavior of devices the same within a desired accuracy, when the same input is applied.

Throughout this specification and the appended claims, the term 'absolute calibration' refers to the process of calibrating device properties with units instead of dimensionless ratios. Similarly, 'absolute value' of a parameter refers to the value of a parameter with units, not a dimensionless ratio.

The present specification provides systems and methods for calibrating the elements of a system, for example a quantum processor. More specifically, the embodiments describe therein provide systems and methods for improving the calibration of a quantum processor by reducing calibration errors and reducing the variation in the value of parameters of the elements of a quantum processor, for example qubits.

Examples of calibration techniques are described in US Patent Publication No. 2014/0229722.

As an illustrative example, a superconducting quantum processor designed to perform adiabatic quantum computation and/or quantum annealing is herein described. However, a person skilled in the art will understand that that present systems, methods and apparatus may be applied to any form of quantum processor hardware, including, but not limited to, superconducting, photonic, ion-trap, quantum dot, topological, etc., implementing any form of quantum algorithm (e.g., quantum annealing, gate model quantum computing, etc.).

The embodiment described herein may be used to implement systems and methods for reducing errors and calibrate the elements of a systems, for example a quantum processor. Other methods and apparatus for calibrating quantum processors are discussed in US Patent Publication No. US2014/0229722.

FIG. 1 is a schematic diagram of a portion of an example quantum processor 100 including two superconducting flux qubits communicatively coupled to each other via a tunable coupling device. Processor 100 comprises first qubit 101, second qubit 102 and tunable coupling device 103. Additional devices may be coupled to first and second qubits 101 and 102 and/or coupling device 103 and are not shown in FIG. 1 to reduce clutter.

Coupling device 103 provides tunable communicative coupling between first qubit 101 and second qubit 102. Coupling device 103 is inductively coupled to first qubit 101 via a mutual inductance 104 and to second qubit 102 via a mutual inductance 105. The portion of quantum processor 100 shown in FIG. 1 has only two qubits and one coupling device; however, a person skilled in the art will understand that quantum processor 100 may comprise any number of qubits and coupling devices.

A number of programming interfaces 106a though 106g (collectively, 106) may be used to configure and control the state of processor 100. In particular, interfaces 106 may be used to couple a flux signal to compound Josephson junctions 107a-107c (collectively, 107) and compound-compound Josephson junctions (CCJJ) 108a and 108b (collectively, 108) of first and second qubits 101 and 102, thereby enabling the terms of a specific Hamiltonian to be programmed into processor 100. Interfaces 106 may be realized by an inductive coupling structure.

First qubit 101 is inductively coupled to a first latching device 109 via a mutual inductance 110. First latching device 109 comprises a compound Josephson Junction 111, controlled by a programming interface 112. The state of first qubit 101 is defined by the persistent current of first qubit 101. The persistent current of first qubit 101 can be read out by coupling first qubit 101 to a second latching device 113 via first latching device 109, according to the teaching of U.S. Pat. No. 8,169,231. Second latching device 113 is inductively coupled to first latching device 109 via a mutual inductance 114. Second latching device 113 comprises a compound Josephson Junction 115, controlled by programming interface 116. Second latching device 113 can be inductively coupled to a shift register (not shown in FIG. 1 to reduce clutter).

Second qubit 102 is inductively coupled to a third latching device 117 via a mutual inductance 118. Third latching device 117 comprises a compound Josephson junction 119, controlled by a programming interface 120. The state of second qubit 102 is defined by the persistent current of second qubit 102. The persistent current of second qubit 102 can be read out by coupling second qubit 102 to a fourth latching device 121 via third latching device 117, according to the teaching of U.S. Pat. No. 8,169,231. Fourth latching device 121 is inductively coupled to third latching device 117 via a mutual inductance 122. Fourth latching device 121 comprises a compound Josephson Junction 123, controlled by programming interface 124. Fourth latching device 121 can be inductively coupled to a shift register (not shown in FIG. 1 to reduce clutter).

Processor 100 comprises a dedicated calibration signal source 125 for at least partially improving speed and accuracy during a calibration procedure. A dedicated calibration signal source may be implemented as a superconducting signal line (e.g., a superconducting signal path). Calibration signal source 125 is galvanically coupled to second latching device 113 and fourth latching device 121. Calibration signal source 125 may be electrically coupled to signal generation and control electronics (not shown in FIG. 1) that may be external to processor 100 and housed at room temperature. The current through calibration signal source 125 may be substantially larger than the critical current of second latching device 113 and fourth latching device 121 such that the vast majority of the current though calibration signal source 125 is routed through mutual inductance 114 between first latching device 109 and second latching device 113 and mutual inductance 122 between third latching device 117 and fourth latching device 121.

Quantum processor 100 may include other devices, such as mechanisms to compensate for changes in qubit persistent current during annealing, and, or mechanism for measuring other parts of the system, are not shown in FIG. 1 to reduce complexity.

Many of the parameters of first and second qubits 101 and 102 of processor 100 can be inferred from the persistent current in first and second qubits 101 and 102, respectively, in response to signals applied through the varying programming interfaces, through calibration signal source 125 or through dedicated control signal lines (not shown in FIG. 1). For example, many parameters of first qubit 101, as well as parameters governing the interactions between first qubit 101, first latching device 109 and second latching device 113, may generally be inferred from the measurement of the persistent current in first qubit 101. However, the value of the persistent current in first qubit 101 that is actually read out by second latching device 113 depends on a number of factors, such as the coupling between first qubit 101 and first latching device 109 (i.e., mutual inductance 110) and the coupling between first latching device 109 and second latching device 113 (i.e., mutual inductance 114), and/or interactions due to other devices that may be coupled to first qubit 101, first latching device 109 and second latching device 113 in different implementations of processor 100. In particular, the value of the persistent current of first qubit 101 read out by second latching device 113 depends on mutual inductance 110 and on mutual inductance 114. These factors can be leveraged to infer the value of the persistent current of first qubit 101, as explained in detail in U.S. Patent Publication No. US2014/0229722. In addition, the interaction between qubits that are inductively coupled together through a coupling device influences the reading of the persistent current of one of the qubits. For example, a persistent current in first qubit 101 may result in a persistent current in second qubit 102 that depends on the inductive coupling of first qubit 101 to coupling device 103 (e.g., mutual inductance 104) and on the inductive coupling of coupling device 103 to second qubit 102 (e.g., mutual inductance 105), in addition to the inductive couplings to first and third latching devices 109 and 117, and second and fourth latching devices 113 and 121.

In some implementations, a calibration signal may be applied to first qubit 101 and/or second qubits 102 via a calibration signal source galvanically coupled to first and/or third latching devices 109 and/or 117, respectively, according to the teaching of U.S. Patent Publication No. 2014/0229722.

Figure 2:
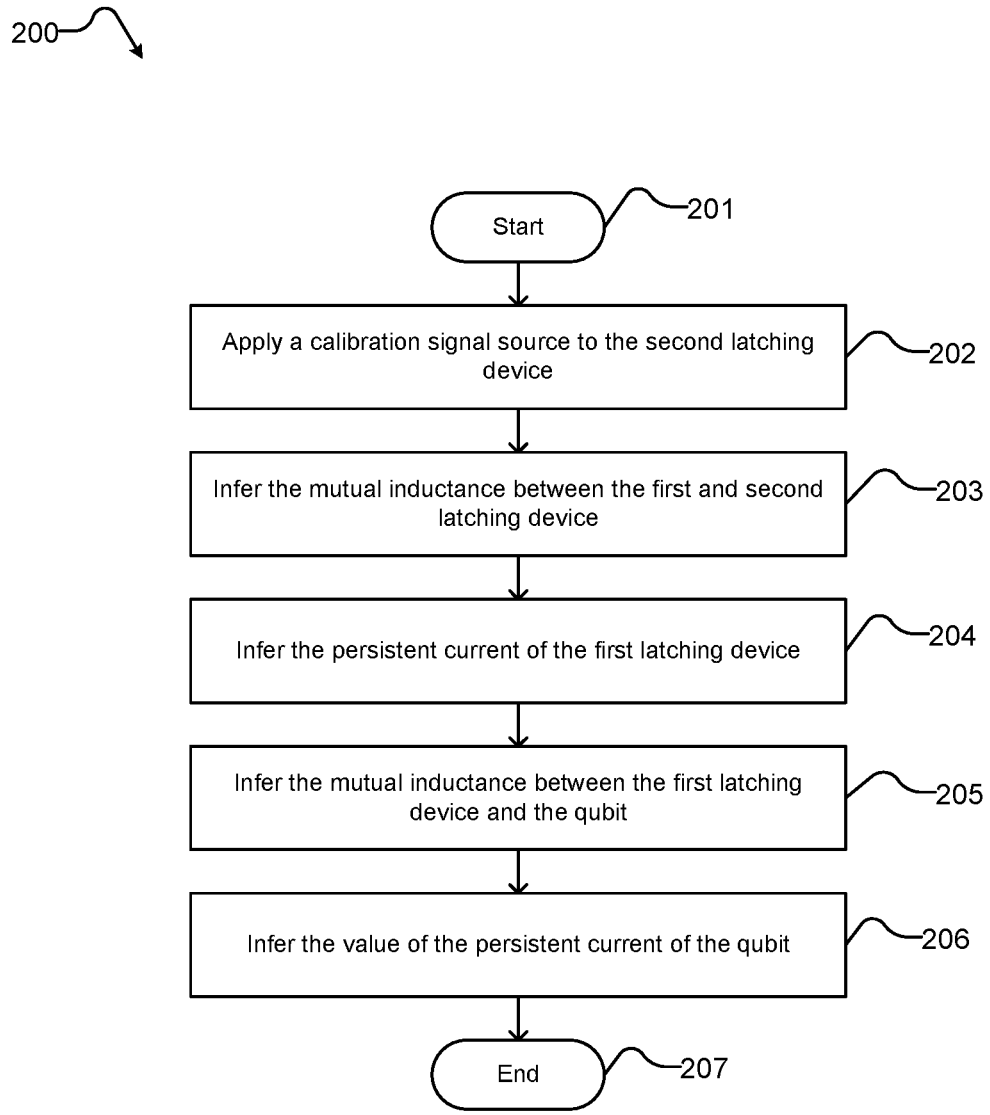
FIG. 2 is a flow diagram of an example method for absolutely calibrating devices using a calibration current.

FIG. 2 is a flow diagram of an example method 200 for absolutely calibrating devices in a processor, for example processor 100, using a calibration current. In some implementations, method 200 may be used at act 1102 of method 1100 for absolutely calibrating devices using a calibration current as the first calibration standard, as described below with reference to method 1100 of FIG. 11. Method 200 is described with reference to processor 100 of FIG. 1.

Method 200 comprises acts 201 to 207; however, a person skilled in the art will understand that the number of acts is an example, and, in some implementations, certain acts may be omitted, further acts may be added, and/or the order of the acts may be changed.

Method 200 starts at 201, for example in response to call from another routine.

At 202, a calibration signal source is applied to second latching device 113. In some implementations, a calibration signal source is applied to calibration signal source 125. The calibration signal source may be supplied by electronics external to processor 100, e.g., at room temperature. Calibration current $I_{cal}$ then flows through mutual inductance 114 ($M_{114}$) between second latching device 113 and first latching device 109.

At 203, mutual inductance 114 is inferred. The change in calibration current $\Delta I_{cal}$ causes a flux change $\Delta\Phi_{cal\to109}$ in the body a first latching device 109, where the flux period of the flux bias of the body of first latching device 109 has been previously calibrated. Programming interface 112 can be used to bias compound Josephson junction 111 of first latching device 109 to detect $\Delta\Phi_{cal\to409}$. Mutual inductance 114 can be inferred as follows:

$$M_{114} = \frac{\Delta\Phi_{cal\to109}}{2I_{cal}}$$

At 204, the persistent current $I_{109}$ flowing in first latching device 109 is inferred. Given $M_{114}$ from act 203 above, and the flux change $\Delta\Phi_{109\to113}$ into second latching device 113, the persistent current $I_{109}$ can be inferred as follows:

$$|I_{109}| = \frac{\Delta\Phi_{109\to113}}{2M_{114}}$$

Where $\Delta\Phi_{109\to113}\equiv\Delta I_{109\to113}/P_{113}$, with $\Delta I_{109\to113}$ being the difference in current supplied to programming interface 116 to bias second latching device 113 and the flux period $P_{113}$ of second latching device 113 with respect to the current supplied to programming interface 116.

At 205, mutual inductance 110 is inferred. Given the persistent current $I_{109}$ of the first latching device from act 204 above and the flux change $\Delta\Phi_{109\to101}$ in qubit 101, mutual inductance 110 can be inferred as follows:

$$M_{110} = \frac{\Delta\Phi_{109\to101}}{2|I_{109}|}$$

Where $\Delta\Phi_{109\to101}\equiv\Delta I_{109\to101}/P_{101}$, with $\Delta I_{109\to101}$ the difference in current supplied to programming interface 106f that flux biases the body of qubit 101 and the flux period $P_{101}$ of qubit 101 with respect to the current supplied to programming interface 106f.

At 206, the absolute value of the persistent current $I_{101}$ of qubit 101 is inferred. Given the mutual inductance 110 from act 205 and the flux change $\Delta\Phi_{101\to109}$ of qubit 101 detected by first latching device 109, the persistent current of qubit 101 can be calculated as follows:

$$|I_{101}| = \frac{\Delta\Phi_{101\to109}}{2M_{110}}$$

Where $\Delta\Phi_{101\to109}\equiv\Delta I_{101\to109}/P_{109}$, with $P_{109}$ the difference in current supplied to programming interface 112 that flux biases first latching device 109 and the flux period $P_{109}$ of first latching device 109 with respect to the current supplied to programming interface 112.

Given $|I_{101}|$, it is possible to determine other parameters of qubit 101, for example inductance and critical current.

At 207, method 200 terminates, until it is for example, invoked again.

When calibrating a processor, such as processor 100 of FIG. 1, it is desirable to obtain the absolute value of parameters of the device of processor 100 and to determine outlier devices. Outlier devices may be defined as devices in processor 100 that behave significantly differently (e.g., outside a predetermined error range) when the same signal is applied. It is desirable to detect outlier devices so as, for example, exclude them from a working graph of processor to try to at least partially reduce calculation errors when processor 100 performs a calculation.

Figure 3:
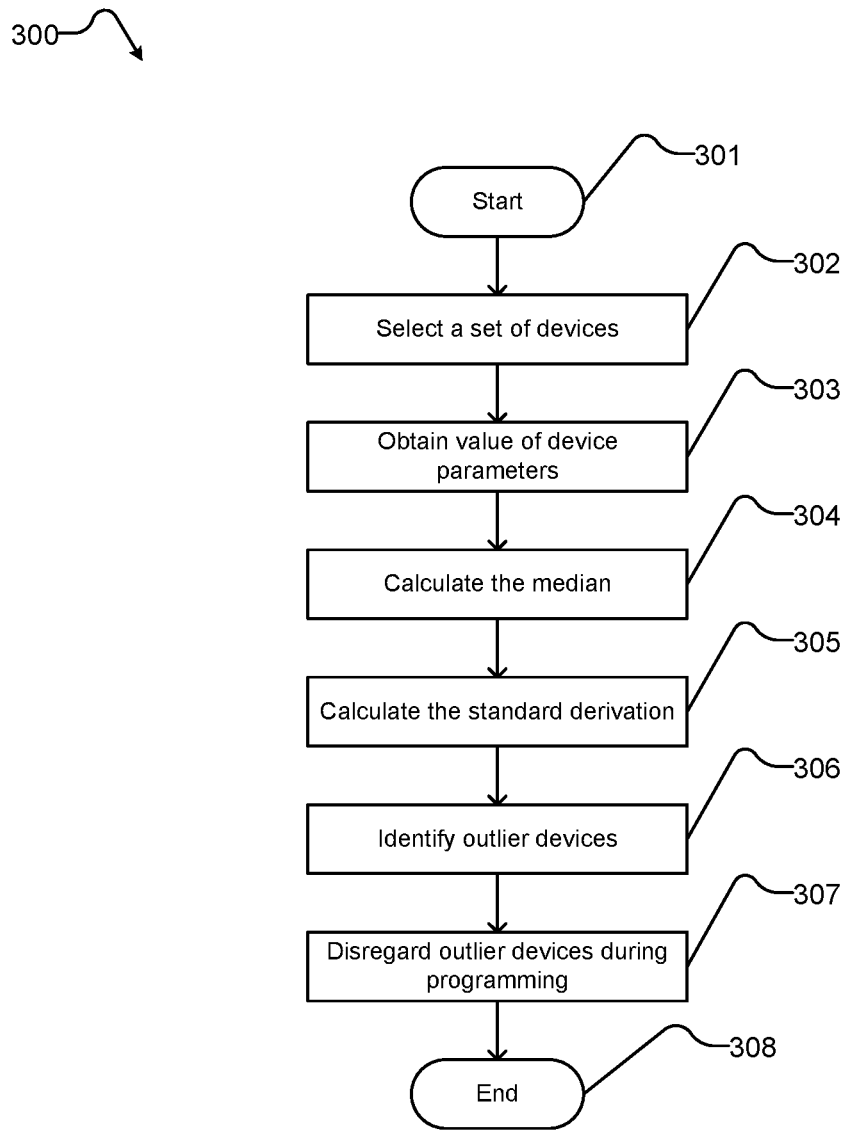
FIG. 3 is a flow diagram of an example method for reducing errors in a system comprising a plurality of calibrated devices by detecting outliers.

FIG. 3 is a flow diagram of an example method 300 for reducing errors in a system comprising a plurality of calibrated devices. Method 300 may, therefore, be employed after calibrating the devices of a quantum processor, for example processor 100 of FIG. 1, to attempt to reduce variations in the response of different elements, e.g., qubits and couplers, to the same applied signal. Method 300 may be applied anytime that a processor is subject to any change that may have modified the behavior of some of the devices. Method 300 is described with reference to FIG. 1.

Method 300 comprises acts 301 to 308; however, a person skilled in the art will understand that the number of acts is an example, and, in some implementations, certain acts may be omitted, further acts may be added, and/or the order of the acts may be changed.

Method 300 starts at 301, for example in response to a call from another routine, e.g., after the end of a calibration process.

At 302, a set of devices is selected. The set may comprise devices that are communicatively coupled or adjacent in a region of processor 100, for example first and second qubits 101 and 102 in FIG. 1. In some implementations, step 302 is omitted and the entire processor is considered.

At 303, the values of one or more device parameters are obtained. Examples of device parameters are: electric moment, magnetic moment, and low energy quantum eigenspectrum spacing. In at least one implementation, a device parameter may be the persistent current of first qubit 101 in response to a determined applied signal. Such values may be read out at 303 by providing a determined input and reading out device responses. In some implementations, device parameter values may have been read out and stored in a separate memory storage device as part of a calibration procedure.

At 304, the median value for each device parameter is calculated. Standard methods for calculating the median may be applied.

At 305, the standard deviation for each device parameter is calculated. Standard methods for calculating the standard deviation may be applied.

At 306, outlier devices are identified within the set of devices selected at 302. Outlier devices may be defined as those devices that have parameter values substantially different from the median. Such devices may be broken, or they may be subject to noise sources that make them behave substantially differently from other devices considered. In one implementation, outlier devices may be defined as those devices that have parameter values more than three standard deviations away from the median.

At 307, the processor in programmed so that outlier devices are disregarded or isolated. For example, in one implementation, outlier devices may be excluded from a working graph of the processor so that they will not be utilized for future calculations.

At 308, method 300 terminates, until it is, for example, invoked again.

The interaction between first and second qubits 101 and 102 of FIG. 1 via coupling device 103 can be leveraged in the context of a calibration process to try to reduce errors when determining absolute parameters of the devices in processor 100. A persistent current of first qubit 101 can also be used to generate a flux signal in second qubit 102 that is mediated by coupling device 103, thus providing a way to calculate a value of the effective mutual inductance of coupling device 103, where the effective mutual inductance is the combined effect of mutual inductances 104 and 105 of coupling device 103. Similarly, a persistent current of second qubit 102 can be used to generate a flux signal in first qubit 101, thus providing a way to self-check consistency of the value of the effective mutual inductance of coupling device 103.

Figure 4:
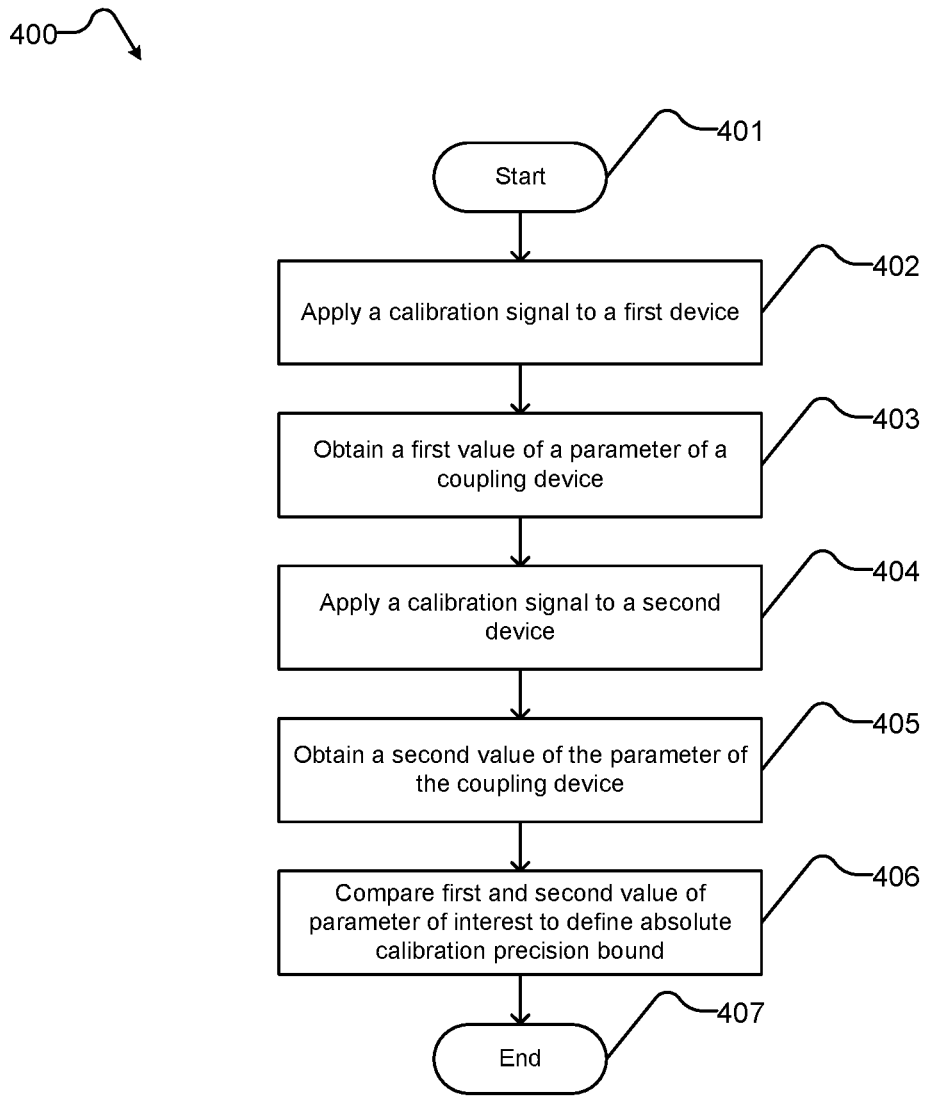
FIG. 4 is a flow diagram of an example method for reducing errors in a system comprising a plurality of calibrated qubits by self-checking consistency.

FIG. 4 is a flow diagram of an example method 400 for reducing errors in a system comprising a plurality of calibrated devices by self-checking consistency of absolute calibration. Method 400 may, therefore, be employed after calibrating the devices of a quantum processor, for example processor 100 of FIG. 1, to attempt to reduce variations in the response of different elements, e.g., qubits and couplers, to the same applied signal. Method 400 may be applied anytime that a processor is subject to any change that may have modified the behavior of some of the devices. Method 400 is described with reference to FIG. 1.

Method 400 comprises acts 401 to 407; however, a person skilled in the art will understand that the number of acts is an example, and, in some implementations, certain acts may be omitted, further acts may be added, and/or the order of the acts may be changed.

Method 400 starts at 401, for example in response to a call from another routine, e.g., after the end of an absolute calibration procedure.

At 402, a calibration signal is applied to a first device, for example first qubit 101 of FIG. 1. In at least one implementation, when all elements of processor 100 have been calibrated, a calibration signal can be applied via calibration signal source 125. In another implementation, programming interface 106d may be used to provide a persistent current in first qubit 101. The persistent current of first qubit 101 creates a flux signal in second qubit 102, mediated by coupling device 103.

At 403, a first value of a parameter of interest of coupling device 103 is obtained. For example, a first value of an effective mutual inductance $M'_{103}$ of coupling device 103 is inferred from the change of flux in second qubit 102, $\Delta\Phi_{102}$, given the value of the persistent current in first qubit 101, $I_{101}$.

$$M'_{103} = \frac{\Delta\Phi_{102}}{2|I_{101}|}$$

At 404, a calibration signal is applied to a second device, communicatively coupled to the first device, for example second qubit 102. In at least one implementation, when all elements of processor 100 have been calibrated, a calibration signal can be applied to second qubit 102 via calibration signal source 125. In another implementation, programming interface 106e may be used to provide a persistent current in second qubit 102. The persistent current of second qubit 102 creates a flux signal in first qubit 101, mediated by coupling device 103.

At 405, a second value of a parameter of interest of coupling device 103 is obtained. For example, a second value of the effective mutual inductance $M''_{103}$ of coupling device 103 is inferred from the change of flux in first qubit 101, $\Delta\Phi_{101}$, given the value of the persistent current in second qubit 102, $I_{102}$.

$$M''_{103} = \frac{\Delta\Phi_{101}}{2|I_{102}|}$$

At 406, the first and second values of the parameter of interest are compared. For example, the first and second values of the effective mutual inductance, $M'_{103}$ and $M''_{103}$, of coupling device 103 are compared. The result of comparison can be used to define a bound on the precision of the absolute calibration procedure completed before invoking method 400.

At 407, method 400 terminates, until is, it for example, invoked again.

A self-consistency check may not be sufficient to ensure accuracy of an absolute calibration procedure, as systematic errors can lead to common multiplicative errors during the calculation of the mutual inductance at 403 and 405 and, therefore, would not be detected by method 400.

In some implementations of a quantum processor, devices such as qubits have more than one pairwise inductive coupling to other qubits. Thus, iteratively checking for self-consistence on all or part of a processor can be useful for identifying outlier devices (e.g., devices whose absolute calibration is significantly different than a calculated mean value, similarly to method 300 of FIG. 3). Outlier devices may be broken, be subject to noise sources, or be subject to absolute calibration errors.

Figure 5:
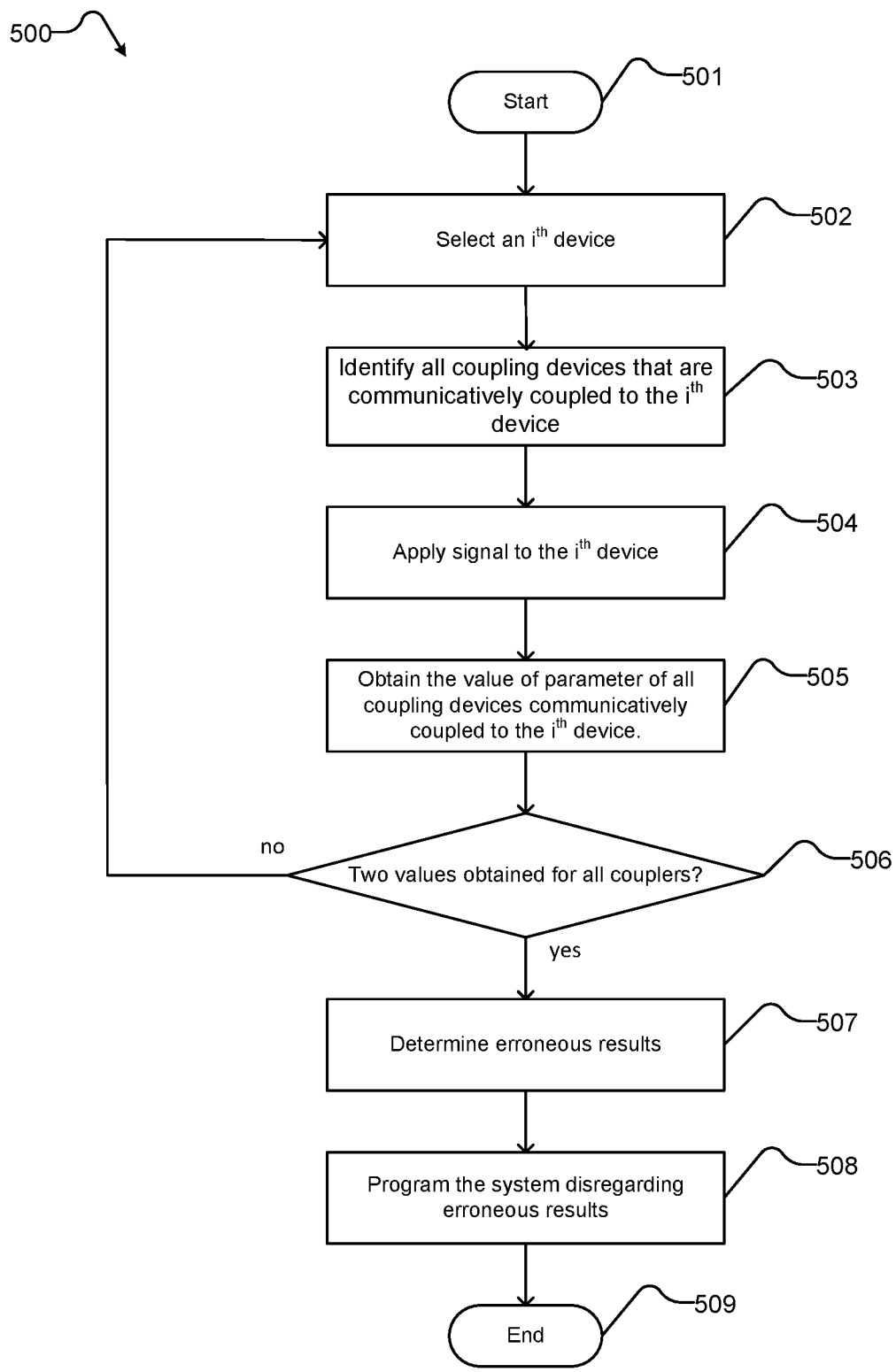
FIG. 5 is a flow diagram of an example iterative method for reducing errors in a system comprising a plurality of calibrated qubits by finding erroneous results in the consistency self-check.

FIG. 5 is a flow diagram of an example iterative method 500 for reducing errors in a system comprising a plurality of calibrated qubits by finding erroneous results in the self-consistency check of absolute calibration, where an erroneous result may be defined as a measured value for a parameter significantly different from another measured value for the same parameter. Erroneous results are detected by performing a plurality of independent measurements of the same parameter. Method 500 may, therefore, be employed after calibrating the devices of a quantum processor, for example processor 100 of FIG. 1, to attempt to reduce variations in the response of different elements, e.g., qubits and couplers, to the same applied signal. Method 500 may be applied anytime that a processor is subject to any change that may have modified the behavior of some of the devices. Method 500 is described with reference to FIG. 1. Method 500 may be used in conjunction with other methods to reduce errors in a system of calibrated devices, for example method 300 of FIG. 3 and method 400 of FIG. 4, as part of-or after an absolute calibration process.

Method 500 comprises acts 501 to 509; however, a person skilled in the art will understand that the number of acts is an example, and, in some implementations, certain acts may be omitted, further acts may be added, and/or the order of the acts may be changed.

Method 500 starts at 501, for example in response from a call from another routine, e.g., after the end of an absolute calibration procedure.

At 502, an $i^{th}$ device is selected, for example first qubit 101 of process 100 is selected. An indexing of all devices, including pairwise inductive couplings to other devices, in processor 100 may be provided to method 500 as part of a set of inputs. A counter i=0, ..., n, where n is the number of devices, may be employed. The $i^{th}$ device may be selected at random or according to a predetermined rule.

At 503, all of the coupling devices that are communicatively coupled to the $i^{th}$ device are identified. For example, coupling device 103 is identified.

At 504, a calibration signal is applied to the $i^{th}$ device selected at 502, for example first qubit 101 of processor 100, as described above in more details with reference to act 402 of method 400.

At 505, a value of a parameter of interest of all coupling devices communicatively coupled to the $i^{th}$ qubit is obtained. For example, a value of the mutual inductance of coupling device 103 is obtained. The value of the mutual inductance can be obtained as described with reference to act 403 of method 400.

At 506, method 500 checks whether at least two values of the parameter of interest for all the coupling devices of processor 100 have been obtained. Given that a device may have more than one pairwise inductive coupling to another device, iterating through method 500 may result in at least two values of a parameter of interest for all coupling devices in processor 100. In one implementations, if there are N devices in processor 100 and each device has M pairwise inductive coupling to other devices, the iteration thought method 500 results in N×M measurements. If the condition is not satisfied the counter i is incremented and control passes to 502, where another device in processor 100 is selected, otherwise to 507.

At 507, the values of the parameters of interest for all coupling devices are used to identify erroneous results. Erroneous results may be erroneous measurements in any of the parameters of the devices of processor 100. For example, if calibrated device j is used to obtain values of the parameter of interest of M coupling devices connected to it and the values obtained do not agree with other measurements, it can be inferred that the absolute calibration of device j is erroneous. In at least one implementation, the parameter of interest of a coupling device can be used in an absolute calibration procedure to infer the value of a parameter of a device of processor 100. In one implementation, if there are N devices in processor 100 and each device has M pairwise inductive coupling to other devices, the iteration through method 500 results in N×M independent measurements of parameters of coupling devices that can be used to infer N parameters of the devices of processor 100. Some of the values of the N parameters may be erroneous results due to measurement errors and may be detected, for example via best-fit procedure or averaging methods.

At 508, the system is programmed so that erroneous results are disregarded or isolated.

At 509, method 500 terminates, until it is for example invoked again.

Figure 6:
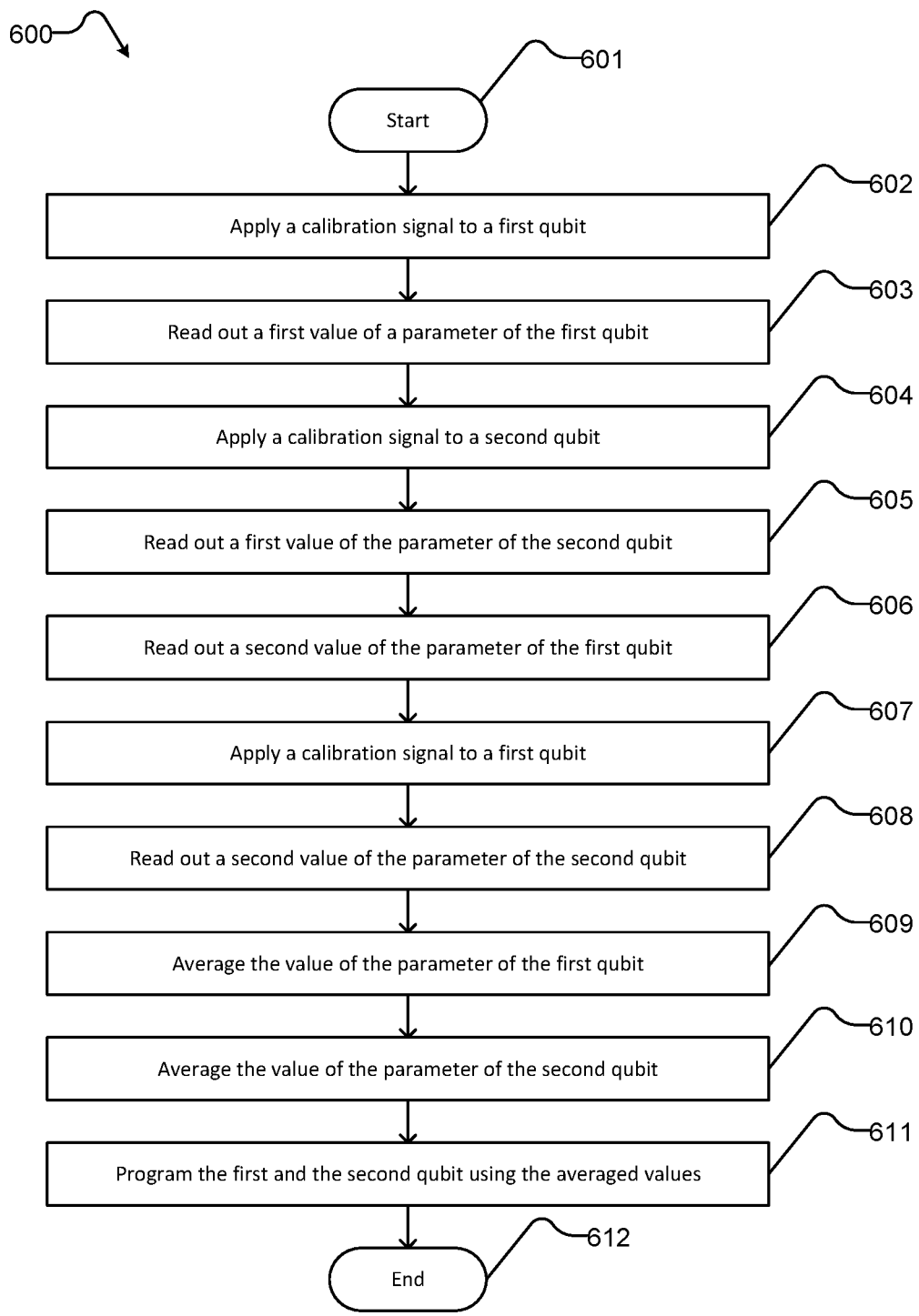
FIG. 6 is a flow diagram of an example method for reducing errors in a system comprising a plurality of calibrated devices by averaging the value of system parameters.

FIG. 6 is a flow diagram of an example method 600 for reducing errors in a system comprising a plurality of calibrated devices by averaging the value of system parameters. Systems parameters may comprise: electric moment, magnetic moment, and low energy quantum eigenspectrum spacing. Method 600 may, therefore, be employed after calibrating the devices of a quantum processor, for example processor 100 of FIG. 1, to attempt to reduce variations in the response of different elements, e.g., qubits and couplers, to the same applied signal. Method 600 may be applied anytime that a processor is subject to any change that may have modified the behavior of some of the devices. Method 600 is described with reference to FIG. 1.

Method 600 comprises acts 601 to 612; however, a person skilled in the art will understand that the number of acts is an example, and, in some implementations, certain acts may be omitted, further acts may be added, and/or the order of the acts may be changed.

Method 600 starts at 601, for example in response to a call from another routine.

At 602, a calibration signal is applied to first qubit 101. The calibration signal can be applied via first applying a calibration signal to calibration signal source 125 or, in alternative embodiments, by applying a calibration signal to a calibration signal source, galvanically coupled to first latching device 109, according to the teaching of U.S. Patent Publication No. 2014/0229722.

At 603, a parameter of interest of first qubit 101 is read out or determined. For example, a first value $M_{110}^1$ of mutual inductance 110 is determined, according to the teaching of U.S. Patent Publication No. 2014/0229722.

At 604, a calibration signal is applied to second qubit 102. The calibration signal can be applied via first applying a calibration signal to calibration signal source 125 or, in alternative embodiments by applying a calibration signal to a calibration signal source, galvanically coupled to third latching device 117, according to the teaching of U.S. Patent Publication No. 2014/0229722.

At 605, the respective parameter of interest of second qubit 102 is read out or determined. For example, a first value $M_{118}^1$ of mutual inductance 118 is determined, according to the teaching of U.S. Patent Publication No. 2014/0229722.

At 606, a second value $M_{101}^2$ of mutual inductance 110 is read out or determined. $M_{110}^2$ depends on the interaction between first qubit 101 and coupling device 103 and the interaction of coupling device 103 and second qubit 102 by virtue of the calibration signal applied to second qubit 102 at act 604. In alternative embodiments, a flux signal in first qubit 101 is generated by applying a persistent current to second qubit 102 via programming interface 106e, thus generating a second value $M_{110}^2$ of mutual inductance 110. Method 600 can be employed after an absolute calibration procedure, so that the absolute value of the effective mutual inductance of coupling device 103 is known. Alternatively, method 400 of FIG. 4 may be employed first to self-check consistency in the value of the mutual inductance of coupling device 103.

At 607, a calibration signal is applied again to first qubit 101, as described above with reference to 602. In alternative embodiments, a persistent current is applied to first qubit 101 via programming interface 106d to generate a flux signal in second qubit 102.

At 608, a second value $M_{118}^2$ of mutual inductance 118 is read out or determined. $M_{118}^2$ depends on the interaction between second qubit 102 and coupling device 103 and the interaction of coupling device 103 and first qubit 101 by virtue of the calibration signal applied to first qubit 101 at 607.

At 609, an average value $\overline{M_{110}}$ is calculated from the first value $M_{110}^1$ of mutual inductance 110, determined at 603, and the second value $M_{110}^2$ of mutual inductance 110, determined at 606.

At 610, an average value $\overline{M_{118}}$ is calculated from the first value $M_{118}^1$ of mutual inductance 118, determined at 605, and the second value $M_{118}^2$ of mutual inductance 118, determined at 608.

At 611, processor 100 is programmed using averaged values $\overline{M_{110}}$ and $\overline{M_{118}}$ of mutual inductances 110 and 118, respectively.

At 612, method 600 terminates, until it is, for example, invoked again.

A person skilled in the art will understand that method 600 may be applied to determine an average value of other parameters of first qubit 101, second qubit 102 and coupling device 103, for example mutual inductances 104 and 105. In addition, method 600 may be applied to more than two communicatively coupled qubits, in which case, additional acts may be added to measure multiple values of a parameter of interest due to signals applied to other coupled qubits.

In addition to reducing errors during calibration it is desirable to homogenize devices in a processor, such as processor 100, so that they behave in a substantially similar way when processor 100 is performing a calculation.

Figure 7:
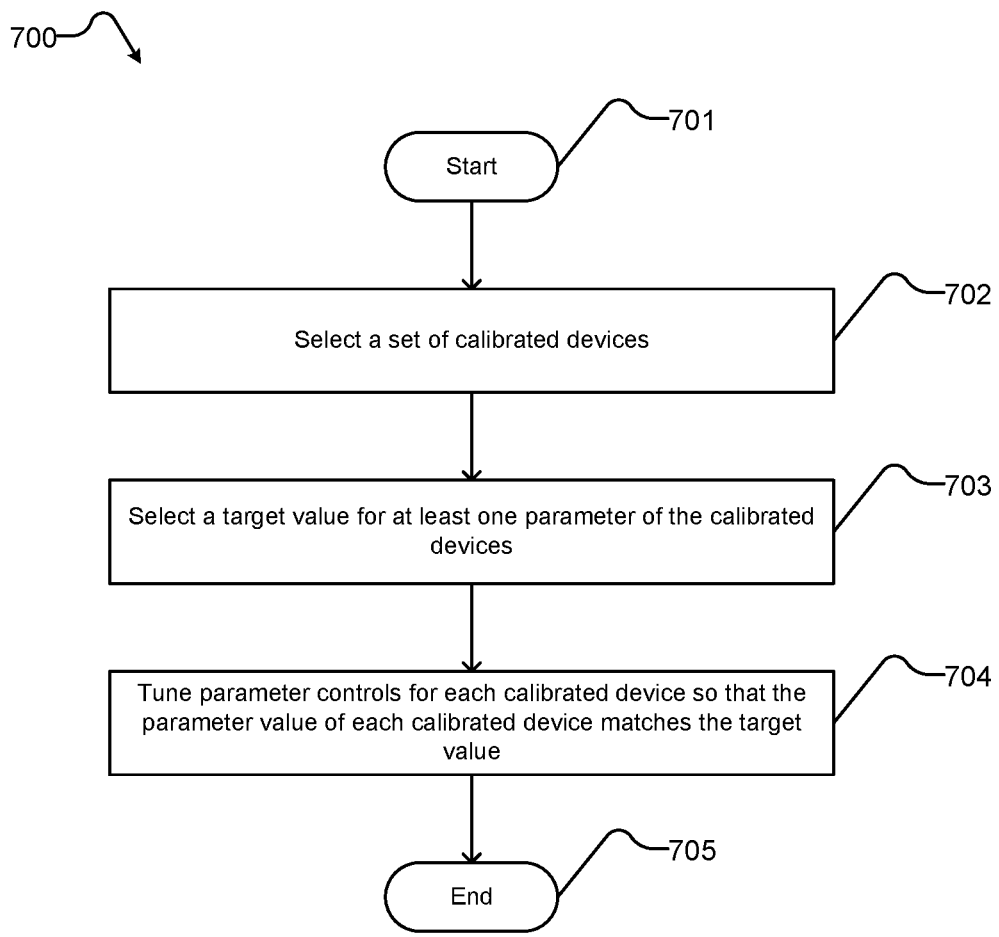
FIG. 7 is a flow diagram of an example method for homogenizing devices in a system comprising a plurality of calibrated devices by tuning parameter controls to a target value.

FIG. 7 is a flow diagram of an example method 700 for homogenizing devices in a system comprising a plurality of calibrated devices by tuning parameter controls to a target value. Method 700 may, therefore, be employed after calibrating the devices of a quantum processor, for example processor 100 of FIG. 1, to attempt to reduce variations in the response of different elements, e.g., qubits and couplers, to the same applied signal. Method 700 may be applied anytime that a processor is subject to any change that may have modified the behavior of some of the devices. Method 700 is described with reference to FIG. 1.

Method 700 comprises acts 701 to 705; however, a person skilled in the art will understand that the number of acts is an example, and, in some implementations, certain acts may be omitted, further acts may be added, and/or the order of the acts may be changed.

Method 700 starts at 701, for example in response to a call from another routine, e.g., after a calibration routine.

At 702, a set of already calibrated devices is selected. The selection can be based on several criteria. For example, set of devices in a particular region of processor 100 may be selected, or a set of devices that are electrically connected by the same signal line(s) may be selected. In one implementation, first and second qubits 101 and 102 are selected.

At 703, a target value for one or more of the parameters for the set of devices selected at 702 is chosen. Some of the parameters that can be of interest in a set of qubits and coupling devices may be, for example, the inductance L, the critical current $I_c$, the coupling strength and/or the compound Josephson junction offset (CJJ-offset). For example, in one implementation of method 700 a value of L=300 pH may be selected. In the present disclosure and the appended claims, the term 'Josephson junction offset' is used to indicate the amount of flux (magnetic moment) applied to, or measured from, a loop of wire containing a Josephson junction. Similarly, the term 'compound Josephson junction offset' is used to indicate the amount of flux (magnetic moment) applied to, or measured from, a loop of wire containing two Josephson junctions.

At 704, device tuners for the parameter(s) of interest are used to set the value of the parameters of interest for the set of devices selected at 702 to the target value chosen at 703. For example, in one implementation of method 700, the L-tuners connected to first qubit 101 and second qubit 102 are set so that both first qubit 101 and second qubit 102 will possess inductance L=300 pH.

At 705, method 700 terminates, until it is for example, invoked again.

Figure 8:
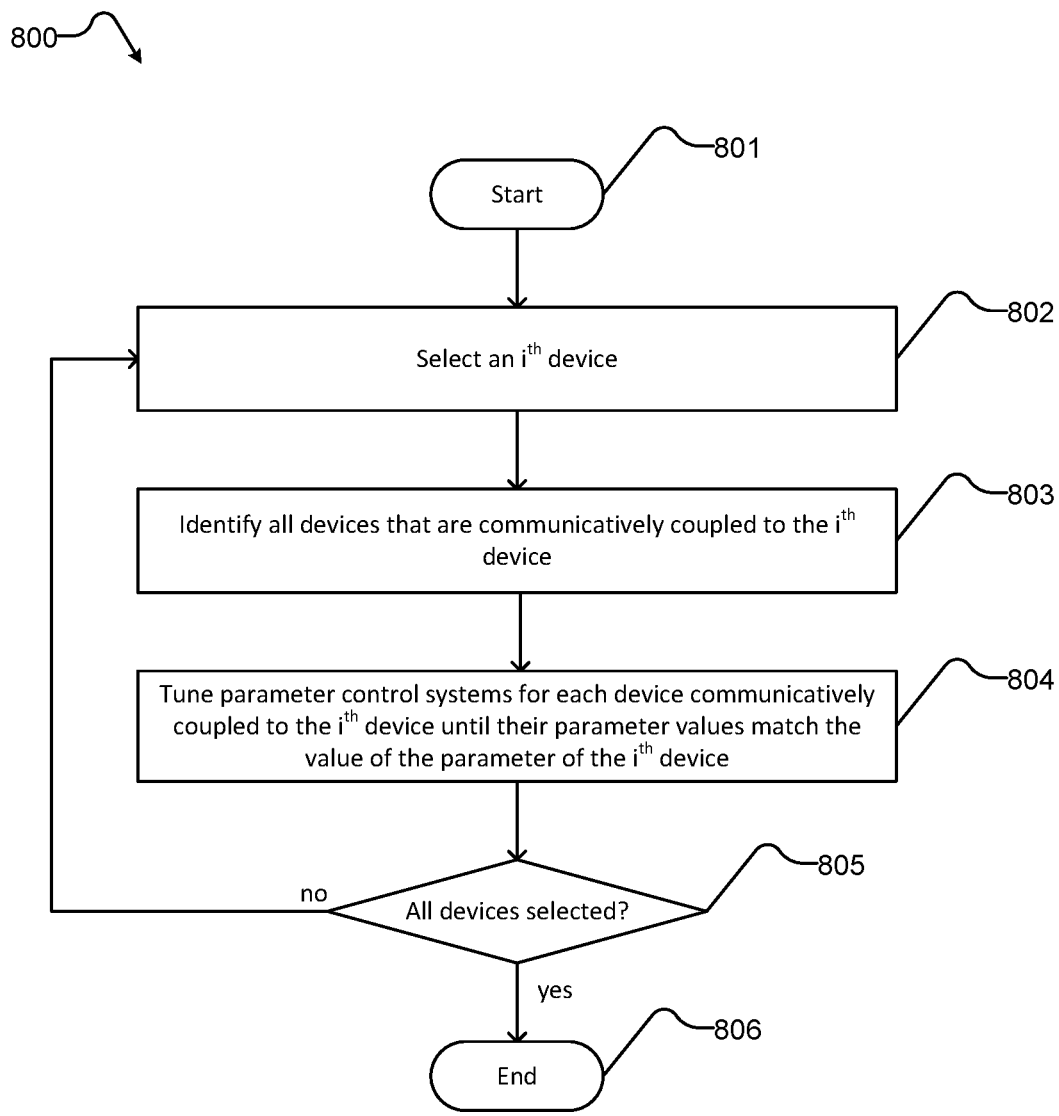
FIG. 8 is a flow diagram of an example method for homogenizing devices in a system comprising a plurality of calibrated devices by tuning parameter controls to match a neighbor device.

FIG. 8 is a flow diagram of an example method 800 for homogenizing devices in a system comprising a plurality of calibrated devices by tuning parameter controls to match a neighbor device, instead of matching a target value.

Method 800 may be employed after calibrating the devices of a quantum processor, for example processor 100 of FIG. 1, to attempt to reduce variations in the response of different elements, e.g., qubits and couplers, to the same applied signal. Method 800 may be applied anytime that a processor is subject to any change that may have modified the behavior of some of the devices. Method 800 is described with reference to FIG. 1.

Method 800 comprises acts 801 to 806; however, a person skilled in the art will understand that the number of acts is an example, and, in some implementations, certain acts may be omitted, further acts may be added, and/or the order of the acts may be changed.

Method 800 starts at 801, for example in response to a call from another routine.

At 802, an $i^{th}$ device is selected. A counter i=0, . . . , n, where n is the number of devices, may be employed. For example, first qubit 101 is selected. The $i^{th}$ device may be selected at random or according to a determined rule.

At 803, all of the devices that are communicatively coupled to the $i^{th}$ device are identified. For example, the devices that are communicatively coupled to first qubit 101 are coupling device 103 and second qubit 102.

At 804, the device tuners for each parameter of interest (for example the inductance L) of each device identified at 803 are tuned to match the respective parameter of interest of the $i^{th}$ device. For example, the L-tuner of coupling device 103 and second qubit 102 are tuned to match inductance L of first qubit 101.

At 805, if not all devices in processor 100 have been selected at 802, the counter i is incremented and control passes to 802, where another device in processor 100 is selected, otherwise control passes to 806.

At 806, method 800 terminates, until it is, for example, invoked again.

In some implementations, method 800 may run only once, so that only one device is selected at 802 and the rest of the devices in processor 100 are homogenized to that first selected device.

Methods 700 and 800 imply that all of the devices in the set of devices selected during the execution of method 700 and 800, respectively, have known values for the parameters, e.g., they have been through an absolute calibration process. However, in some implementations it is desirable to homogenize devices without knowing their parameter values, for example in those instances when it is not necessary to know the precise value of a parameter, or when it is not feasible to perform a long calibration procedure.

Figure 9:
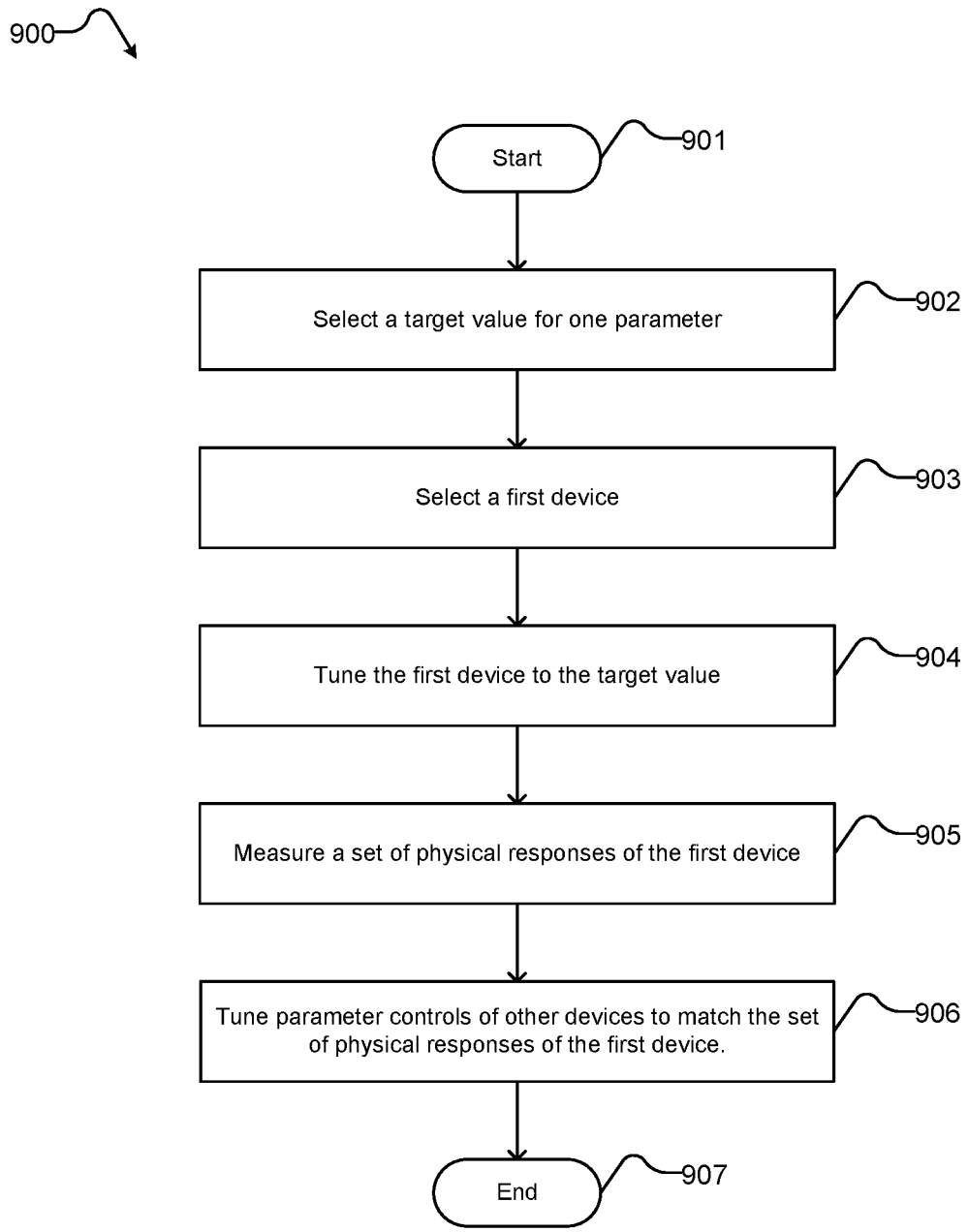
FIG. 9 is a flow diagram of an example method for balancing devices in a system comprising a plurality of calibrated devices by tuning device responses to match the responses of a determined device within the system.

FIG. 9 is a flow diagram of an example method 900 for balancing devices in a system comprising a plurality of devices by tuning device responses to match the responses of a calibrated reference device within the system.

Method 900 is an empirical method that may be employed after calibrating the devices of a quantum processor, for example processor 100 of FIG. 1, to attempt to reduce variations in the response of different elements, e.g., qubits and couplers, to the same applied signal. Method 900 may be applied anytime that a processor is subject to any change that may have modified the behavior of some of the devices. Method 900 is described with reference to FIG. 1.

Method 900 comprises acts 901 to 907; however, a person skilled in the art will understand that the number of acts is an example, and, in some implementations, certain acts may be omitted, further acts may be added, and/or the order of the acts may be changed.

Method 900 starts at 901, for example in response to a call from another routine.

At 902, a target value for a determinable parameter of interest for the devices of processor 100 is selected. For example, a value L=300 pH is selected.

At 903, a first device is selected. For example, with reference to processor 100 of FIG. 1, first qubit 101 is selected.

At 904, the determinable parameter of the first device is set to the target value selected at 902. For example, first qubit 101 is set to have inductance L=300 pH.

At 905, as set of physical responses of the first device are measured. For example, the circulating current and delta at various CII biases is measured for first qubit 101.

At 906, the parameter controls for other devices in processor 100 are tuned to match the physical responses of the first device measured at 905. For example, the L-tuner, Ic-tuner and/or CJJ-offset of second qubit 102 are adjusted so that the circulating current of second qubit 102 is substantially the same as the circulating current of first qubit 101 measured at various CJJ biases at 905.

At 907, method 900 terminates, until it is, for example, invoked again.

Method 900 may be used in conjunction with methods 700 and 800 as part of a calibration procedure.

Many systems and methods for absolute calibration, including the teaching of US Patent Publication No 2014/0229722, rely on accurately knowing an externally supplied current, $I_{cal}$, to absolutely calibrating a chain of mutual inductances. $I_{cal}$ is passed through the primary of a transformer of unknown mutual inductance M that flux biases a device that is designed to have a periodic response to flux (with known period of a single flux quantum $\Phi_0$). M can then be inferred from a measurement of the flux period. Any current flowing in the secondary of that same transformer can then be measured by having a flux detector, with periodic flux response, connected in parallel with the calibration signal line carrying $I_{cal}$ across the primary of the transformer. However, the accuracy of this process depends on the accuracy with which $I_{cal}$ is known in units of current. Therefore, it may be desirable, after an absolute calibration process, to have an independent means to cross-check the final result of absolute calibration.

Figure 10:
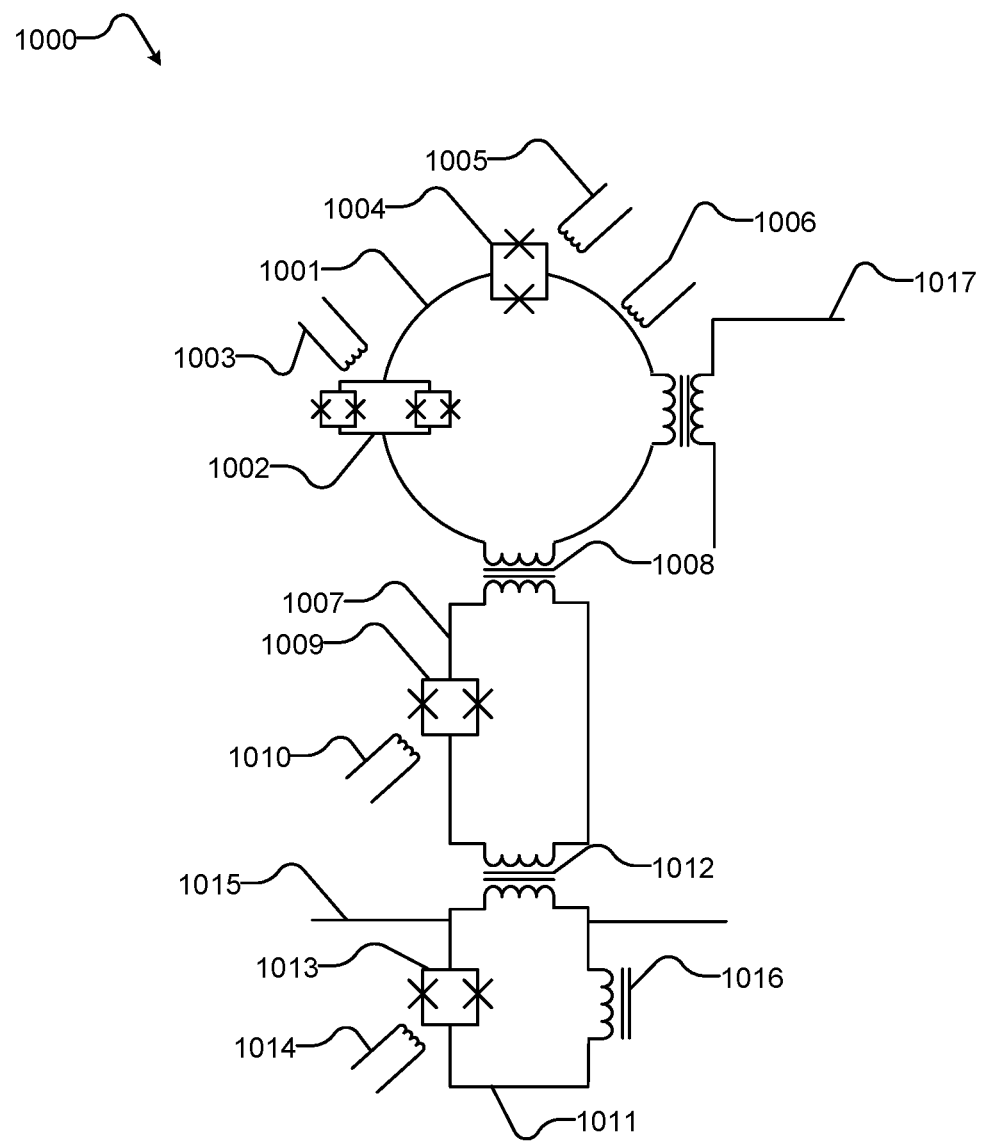
FIG. 10 is a schematic diagram of a portion of an example quantum processor comprising a microwave source that can be used for cross-checking the result of absolute calibration.

FIG. 10 is a schematic diagram of a portion of an example quantum processor 1000 comprising an independently calibrated microwave source that can be used for cross-checking the result of an absolute calibration process. The portion of processor 1000 shown in FIG. 10 comprises a qubit 1001. Qubit 1001 comprises a compound-compound Josephson junction (CCJJ) 1002, controlled by a programming interface 1003, an inductance tuner 1004, controlled by a programming interface 1005, and a programming interface 1006. Qubit 1001 is inductively coupled to a first latching device 1007 through mutual inductance 1008. First latching device 1007 comprises a compound Josephson junction 1009, controlled by a programming interface 1010. First latching device 1007 is, in turn, inductively coupled to a second latching device 1011, through mutual inductance 1012. Second latching device 1011 comprises a compound Josephson junction 1013, controlled by a programming interface 1014. Second latching device 1011 is galvanically coupled to a dedicated calibration signal line 1015. Calibration signal line 1015 may be a superconducting signal path and may be supplied by room temperature electronics. Second latching device 1011 is also inductively coupled to a shift register (not shown in FIG. 9 to reduce complexity) via mutual inductance 1016 to read the state of qubit 1001.

The body of qubit 1001 is inductively coupled to a microwave line 1017. Microwave line 1017 can carry a microwave signal of known frequency that can be used to cross-check the absolute calibration of qubit 1001. In some implementations, microwave line 1017 may be used to compare microwave resonant spectroscopy measurements to a device model whose parameters have been obtained via absolute calibration of qubit 1001. In a processor with multiple qubits it may not be practical to inductively couple a microwave signal line to every qubit, potentially increasing the noise level in the processor. However, the portion of processor 1000 shown in FIG. 10, comprising one qubit, two latching devices and a microwave signal line can be utilized as, or be part of, a test structure in an area of a processor, or, in some implementations, on the side of a processor. Other devices may be connected to qubit 1001, first latching device 1007 and/or second latching device 1011 and are not shown in FIG. 9 to reduce clutter.

Figure 11:
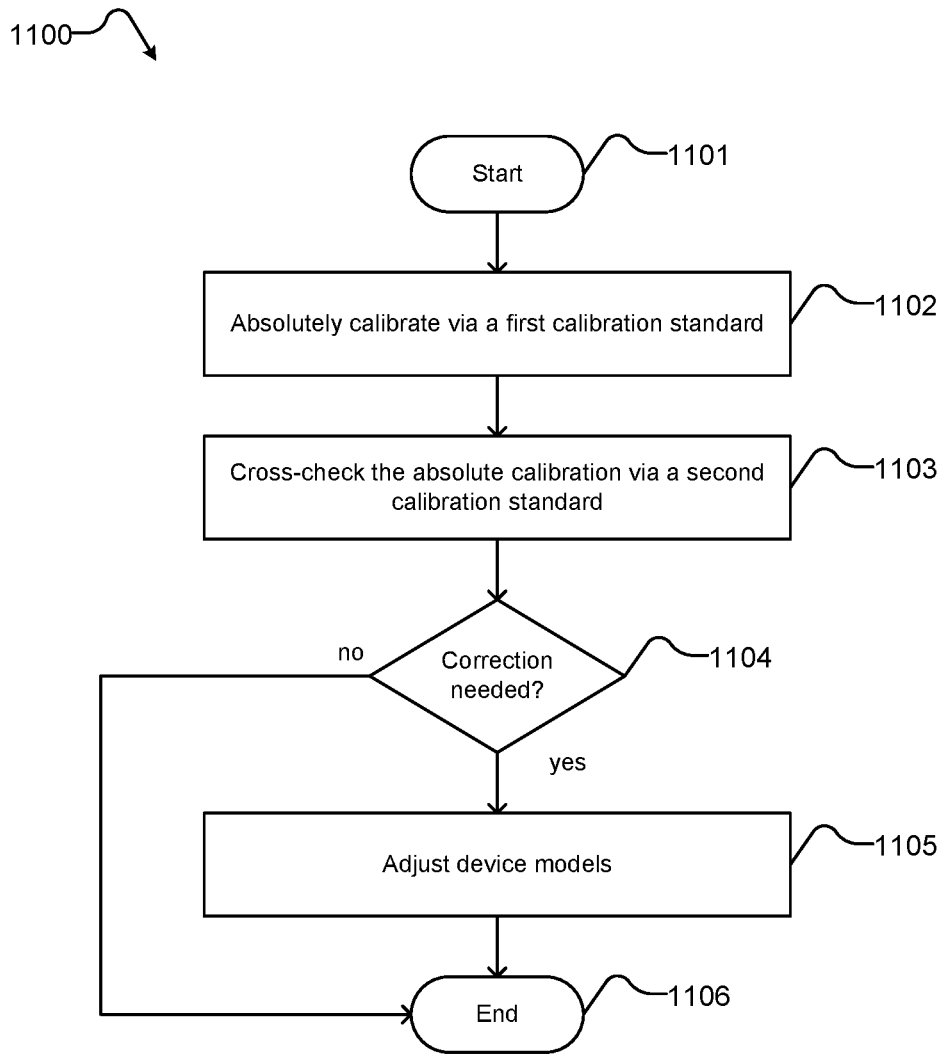
FIG. 11 is a flow diagram of an example method for absolutely calibrating devices and cross-checking the results of calibration.

FIG. 11 is a flow diagram of an example method 1100 for absolutely calibrating devices according to a first calibration standard and cross-checking the results of absolute calibration using a second calibration standard. A calibration standard may be defined as a parameter whose absolute value is known. The calibration standard is then used during a calibration process to infer or calculate the value of device parameters of interests. Method 1100 may be applied as part of a calibration process or anytime that a processor is subject to any change that may have modified the behavior of some of the devices. Method 1100 is described with reference to FIG. 10.

Method 1100 comprises acts 1101 to 1106; however, a person skilled in the art will understand that the number of acts is an example, and, in some implementations, certain acts may be omitted, further acts may be added, and/or the order of the acts may be changed.

Method 1100 starts at 1101, for example in response to a call from another routine.

At 1102, an absolute calibration procedure is performed on one or more devices, using a first calibration standard. For example, a first calibration standard may be a current supplied to the device, as described in more details below with reference to method 200 of FIG. 2.

At 1103, the result of the absolute calibration procedure performed at 1102 is cross-checked using a second calibration standard, different from the first calibration standard. The second calibration standard may be, for example, frequency, as described in more details below with reference to methods 1200a and 1200b of FIGS. 12A and 12B, respectively.

At 1104, device models are checked for the one or more devices absolutely calibrated at 1102. Device models are used to mediate the outcome of microwave-driven experiments, such as, for example, those discussed below with reference to 1202a of method 1200a. Device models, derived, at least in part, from the device parameters absolutely calibrated at 1102, are used in quantum processors, such as processor 1000, to inform inter-qubit balancing, calculate annealing schedules and generally establish other necessary settings for the debugging and operation of a processor. A correction might be needed should device model errors exceed a predetermined threshold. If device models need to be adjusted, control passes to 1105, otherwise to 1106.

At 1105, device models for the one or more devices calibrated at 1102 are adjusted. Depending on the scale of the adjustment needed, other parts of processor 1000 may need to be recalibrated and/or other processes, e.g., annealing schedules, may need to be reestablished.

At 1106, method 1100 terminates, until it is, for example, invoked again.

In general, there could be gain errors and nonlinear effects in any of the quantities inferred during an absolute calibration procedure, as well as other effects due to stray mutual inductances. For example, gain errors and nonlinear effects may be present in any of the quantities inferred at acts 203 through 206 of method 200. It is therefore desirable to cross-check the result of absolute calibration using techniques that are independent of global errors, such as, for example, multiplicative errors in the calibration of $I_{cal}$, for example, act 203 of method 200 may be employed.

Figure 12A:
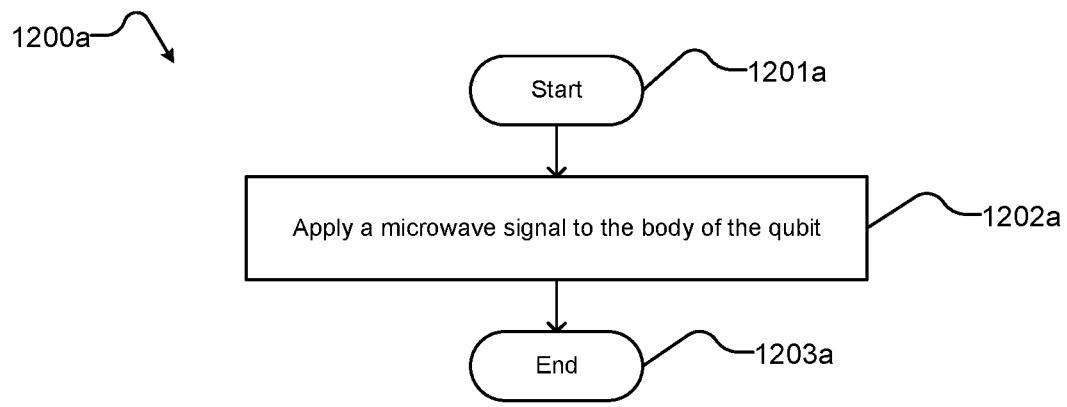
FIG. 12A is a flow diagram of an example method for cross-checking the results of absolute calibration via a second calibration standard using a microwave current.

FIG. 12A is a flow diagram of an example method 1200a for cross-checking the results of absolute calibration via a second calibration standard using a microwave current.

Method 1200a describes the use of a second absolute calibration standard (i.e., frequency) via a dedicated microware line to cross-check the results of an absolute calibration procedure using a first absolute calibration standard (i.e., current). In some implementations, method 1200a may be employed at act 1103 of method 1100 for cross-checking the results of absolutely calibrating devices using frequency as the second calibration standard. Method 1200a is described with reference to processor 1000 of FIG. 10.

Method 1200a comprises acts 1201a to 1203a; however, a person skilled in the art will understand that the number of acts is an example, and, in some implementations, certain acts may be omitted, further acts may be added, and/or the order of the acts may be changed.

Method 1200a starts at 1201a, for example in response to a call from another routine. In some implementations, method 1100 of FIG. 11 at act 1103 may call method 1200a.

At 1202a, a current is applied to microwave line 1017. The current applied at 1202a is of known frequency and can be used to drive resonant spectroscopy. In some applications, it may be desirable to probe some slow incoherent resonant process, such as, for example, photo-assisted tunneling. A continuous microwave signal can be used to populate higher intrawell excited states. Then the slow incoherent interwell tunneling process moves probability between wells.

At 1203a, method 1200a terminates, until it is, for example, invoked again.

Method 1200a describe the use of a second absolute calibration standard (i.e., frequency) via a dedicated microware line to cross-check the results of an absolute calibration procedure using a first absolute calibration standard (i.e., current). However, other means that use this second absolute calibration standard can be employed. Another approach to cross-check the results of an absolute calibration procedure via frequency is to use time, e.g., a clock controlled by a high-quality factor resonator. With reference to processor 1000, if qubit 1001 is equipped with qubit annealing controls that are capable of pulsing qubit 1001 tunnel barrier (i.e., quickly lowering and raising the tunnel barrier), it is possible to perform a free induction decay (FID) procedure. The FID procedure measures the oscillation frequency of qubit 1001 between two potential wells. The measured oscillation frequency equals the tunneling energy divided by h, where h is the Planck constant, thus allowing use of time as a second absolute calibration standard to cross-check the results of an absolute calibration procedure. Qubit annealing controls are described in more details in International Patent Publication No. WO2017075246A1.

Figure 12B:
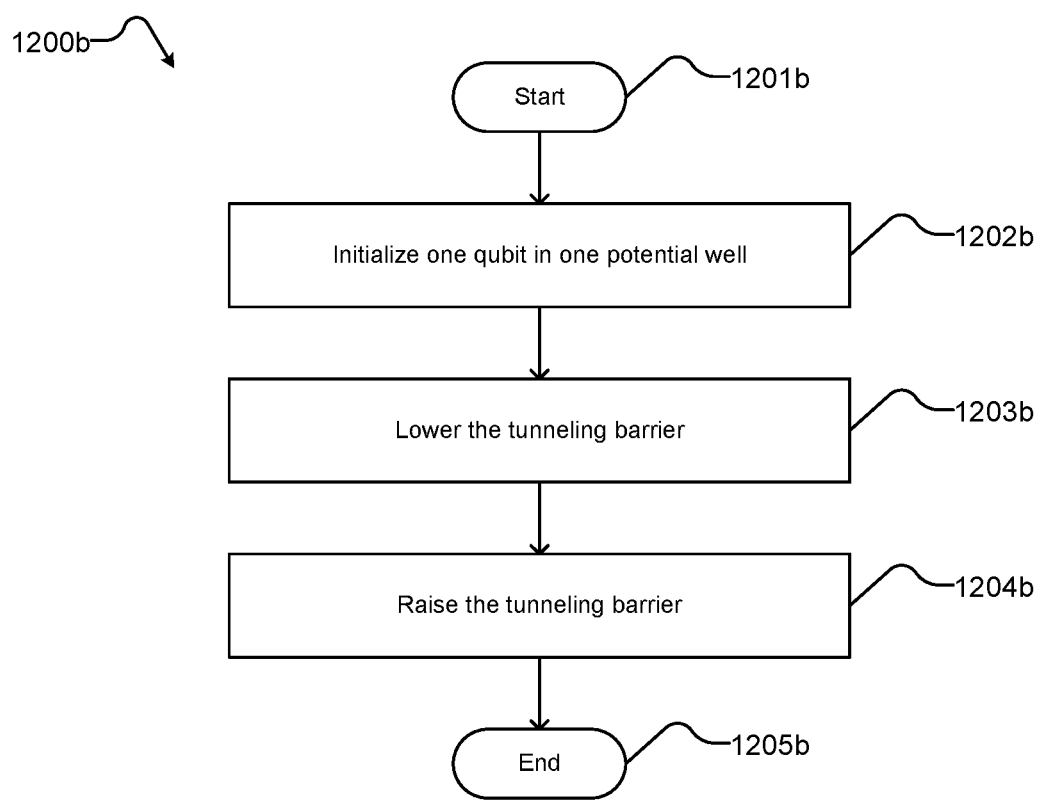
FIG. 12B is a flow diagram of an example method for cross-checking the results of absolute calibration via a second calibration standard using qubit annealing controls.

FIG. 12B is a flow diagram of an example method 1200b for cross-checking the results of absolute calibration via a second calibration standard using qubit annealing controls. In some implementations, method 1200b may be employed at act 1103 of method 1100 for cross-checking the results of absolutely calibrating devices using frequency as the second calibration standard. Method 1200b is described with reference to processor 1000 of FIG. 10.

Method 1200b comprises acts 1201b to 1205b; however, a person skilled in the art will understand that the number of acts is an example, and, in some implementations, certain acts may be omitted, further acts may be added, and/or the order of the acts may be changed.

Method 1200b starts at 1201b, for example in response to a call from another routine. In some implementations, method 1100 of FIG. 11 at act 1103 may call method 1200b.

At 1202b, the state of qubit 1001 is initialized into one potential well with certainty.

At 1203b, the tunnel barrier of qubit 1001 is rapidly dropped using qubit annealing controls. When the barrier is sufficiently low, the state of qubit 1001 can coherently oscillate between two potential wells. The oscillation frequency equals the tunneling energy divided by h, where h is the Planck constant.

At 1204*b* the tunnel barrier of qubit 1001 is rapidly raised using qubit annealing controls. In some implementations, a readout of the of the state of qubit 1001 is performed.

At 1205*b*, method 1200*b* terminates, until it is, for example invoked again.

The above described method(s), process(es), or technique(s) could be implemented by a series of processor readable instructions stored on one or more nontransitory processor-readable media. Some examples of the above described method(s), process(es), or technique(s) method are performed in part by a specialized device such as an adiabatic quantum computer or a quantum annealer or a system to program or otherwise control operation of an adiabatic quantum computer or a quantum annealer, for instance a computer that includes at least one digital processor. The above described method(s), process(es), or technique(s) may include various acts, though those of skill in the art will appreciate that in alternative examples certain acts may be omitted and/or additional acts may be added. Those of skill in the art will appreciate that the illustrated order of the acts is shown for example purposes only and may change in alternative examples. Some of the example acts or operations of the above described method(s), process(es), or technique(s) are performed iteratively. Some acts of the above described method(s), process(es), or technique(s) can be performed during each iteration, after a plurality of iterations, or at the end of all the iterations.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. The teachings provided herein of the various implementations can be applied to other methods of quantum computation, not necessarily the example methods for quantum computation generally described above.

The various implementations described above can be combined to provide further implementations. All of the commonly assigned US patent application publications, US patent applications, foreign patents, and foreign patent applications referred to in this specification and/or listed in the Application Data Sheet are incorporated herein by reference, in their entirety, including but not limited to: U.S. Patent Application No. 62/777,989, US Patent Publication No. US2014/0229722, U.S. Pat. No. 8,169,231, and International Patent Publication No. WO2017075246A1.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method for reducing errors in a processor system comprising a first processor and a second processor, the second processor comprising a plurality of devices, each device in the plurality of devices communicatively coupled to at least one other device via a coupler, each coupler having at least one determinable parameter, and a programming interface communicatively coupled to each device of the plurality of devices, the method comprising:

iteratively repeating until a respective first and second value of the least one determinable parameter of every coupler has been obtained:

selecting an $i^{th}$ device from the plurality of devices of the second processor via the first processor;

identifying all couplers communicatively coupled to the $i^{th}$ device via the first processor;

applying a calibration signal to the $i^{th}$ device via the first processor;

obtaining a respective value of the at least one determinable parameter of every coupler communicatively coupled to the $i^{th}$ device; and using the first and second value of the at least one determinable parameter to determine if any of the devices in the plurality of devices are outlier devices via the first processor.

2. The method of claim 1 wherein:

selecting an $i^{th}$ device from the plurality of devices of the second processor via the first processor includes selecting an $i^{th}$ qubit of a quantum processor via a digital processor;

identifying all couplers communicatively coupled to the $i^{th}$ device via the first processor includes identifying all couplers inductively coupled to the $i^{th}$ qubit via the digital processor;

applying a calibration signal to the $i^{th}$ device via the first processor includes applying a calibration signal to the $i^{th}$ qubit via the digital processor;

obtaining a respective value of the at least one determinable parameter of every coupler communicatively coupled to the $i^{th}$ device includes obtaining a respective value of a mutual inductance of every coupler inductively coupled to the $i^{th}$ qubit; and using the first and second value of the at least one determinable parameter to determine if any of the devices are outlier devices via the first processor includes using the first and second value of the mutual inductance to determine which of the devices in the plurality of devices are outlier qubits, if any of the devices in the plurality of devices are outlier devices, via the digital processor.

3. The method of claim 2, further comprising programming the quantum processor to disregard outlier qubits, if any of the devices are outlier qubits.

4. A method for reducing errors in a processor system comprising a first processor and a second processor, the second processor comprising a plurality of devices, each device in the plurality of devices having at least one determinable parameter, and a programming interface communicatively coupled to each device in the plurality of devices, the method comprising:

applying a calibration signal to a first device via the first processor;

reading out a first device first value of a determinable parameter of the first device, wherein the first device first value depends on the calibration signal applied to the first device;

applying the calibration signal to a second device via the first processor, wherein the second device is communicatively coupled to the first device;

reading out a second device first value of the determinable parameter of the second device, wherein the second device first value depends on the calibration signal applied to the second device;

reading out a first device second value of the determinable parameter of the first device, wherein the first device second value depends on the calibration signal applied to the second device;
applying the calibration signal to the first device via the first processor;
reading out a second device second value of the determinable parameter of the second device, wherein the second device second value depends on the calibration signal applied to the first device;
calculating a first device first measure from the first device first value and the first device second values of the determinable parameter of the first device;
calculating a second device first measure from the second device first value and the second device second values of the determinable parameter of the second device; and
programming the first and the second device via the programming interface using the first device first measure and the second device first measure of the determinable parameter of the first and second device.

5. The method of claim 4 wherein:
applying a calibration signal to a first device via the first processor includes applying a calibration signal to a first qubit via a digital processor;
reading out a first device first value of a determinable parameter of the first device, wherein the first device first value depends on the calibration signal applied to the first device includes reading out a first device first value of a determinable parameter of the first qubit, wherein the first device first value depends on the calibration signal applied to the first qubit;
applying the calibration signal to a second device via the first processor, wherein the second device is communicatively coupled to the first device includes applying the calibration signal to a second qubit via the digital processor, wherein the second qubit is communicatively coupled to the first qubit;
reading out a second device first value of the determinable parameter of the second device, wherein the second device first value depends on the calibration signal applied to the second device includes reading out a second device first value of the determinable parameter of the second qubit, wherein the second device first value depends on the calibration signal applied to the second qubit;
reading out a first device second value of the determinable parameter of the first device, wherein the first device second value depends on the calibration signal applied to the second device includes reading out a first device second value of the determinable parameter of the first qubit, wherein the first device second value depends on the calibration signal applied to the second qubit;
applying the calibration signal to the first device via the first processor includes applying the calibration signal to the first qubit via the first processor;
reading out a second device second value of the determinable parameter of the second device, wherein the second device second value depends on the calibration signal applied to the first device includes reading out a second device second value of the determinable parameter of the second qubit, wherein the second value depends on the calibration signal applied to the first qubit;
calculating a first device first measure from the first device first value and the first device second values of the determinable parameter of the first device includes averaging the first device first value and the second device second values of the determinable parameter of the first qubit to obtain an averaged value of the determinable parameter of the first qubit;
calculating a second device first measure from the second device first value and the second device second values of the determinable parameter of the second device includes averaging the second device first and the second device second values of the determinable parameter of the second qubit to obtain an averaged value of the determinable parameter of the second qubit; and
programming the first and the second device via the programming interface using the first device first measure and the second device first measure of the determinable parameter of the first and second device includes programming the first and the second qubit via the programming interface using the respective averaged values of the determinable parameter of the first and second qubit.

6. The method of claim 5, wherein applying a calibration signal to a first qubit includes applying a calibration signal to a first qubit via a calibration signal source, the calibration signal source electrically coupled to signal generation and control electronics external to the second processor; and applying the calibration signal to a second qubit includes applying the calibration signal to a second qubit via the calibration signal source.

7. The method of claim 5 wherein:
reading out a first device first value of a determinable parameter of the first qubit includes measuring a first device first value of a determinable parameter of the first qubit selected from a group comprising: mutual inductance, electric moment, magnetic moment, and low energy quantum eigenspectrum spacing;
reading out a second device first value of the determinable parameter of the second qubit includes measuring a second device first value of the determinable parameter of the second qubit selected from a group comprising: mutual inductance, electric moment, magnetic moment, and low energy quantum eigenspectrum spacing;
reading out a first device second value of the determinable parameter of the first qubit includes measuring a first device second value of the determinable parameter of the first qubit selected from a group comprising: mutual inductance, electric moment, magnetic moment, and low energy quantum eigenspectrum spacing;
reading out a second device second value of the determinable parameter of the second qubit includes measuring a second device second value of the determinable parameter of the second qubit selected from a group comprising: mutual inductance, electric moment, magnetic moment, and low energy quantum eigenspectrum spacing;
averaging the first device first value and the first device second value of the determinable parameter of the first qubit to obtain an averaged first device value of the determinable parameter of the first qubit includes averaging the first device first value and the first device second value of the determinable parameter of the first qubit selected from a group comprising: mutual inductance, electric moment, magnetic moment, and low energy quantum eigenspectrum spacing to obtain an averaged first device value of the determinable parameter of the first qubit selected from a group comprising:

mutual inductance, electric moment, magnetic moment, and low energy quantum eigenspectrum spacing;

averaging the second device first value and the second device second value of the determinable parameter of the second qubit to obtain an averaged second device value of the determinable parameter of the second qubit includes averaging the second device first value and the second device second value of the determinable parameter of the second qubit selected from a group comprising: mutual inductance, electric moment, magnetic moment, and low energy quantum eigenspectrum spacing to obtain an averaged second device value of the determinable parameter of the second qubit selected from a group comprising: mutual inductance, electric moment, magnetic moment, and low energy quantum eigenspectrum spacing; and programming the first and the second qubit via the programming interface using the averaged first device value and the averaged second device value of the determinable parameter of the first and second qubit includes programming the first and the second qubit via the programming interface using the averaged first device value and the averaged second device value of the determinable parameter of the first and second qubit selected from a group comprising: mutual inductance, electric moment, magnetic moment, and low energy quantum eigenspectrum spacing.

8. A method for reducing errors in a processor system comprising a first processor and second processor, the second processor comprising a plurality of devices, each device in the plurality of devices having at least one determinable parameter, and a programming interface communicatively coupled to the plurality of devices, the method comprising:

absolute calibrating the at least one determinable parameter of at least one device in the plurality of devices using a first calibration standard via the first processor; and cross-checking the absolute calibration of the at least one determinable parameter using a second calibration standard via the first processor.

9. The method of claim 8 wherein, absolute calibrating the at least one determinable parameter of at least one device in the plurality of devices using a first calibration standard via the first processor includes absolute calibrating the at least one determinable parameter of at least one qubit in a plurality of qubits using a first calibration standard via a digital processor.

10. The method of claim 9, wherein absolute calibrating the at least one determinable parameter of the at least one qubit in the plurality of qubits using a first calibration standard includes absolute calibrating the at least one determinable parameter of the at least one qubit in the plurality of qubits using a calibrated current, and cross-checking the absolute calibration of the at least one determinable parameter using a second calibration standard includes cross-checking the absolute calibration of the at least one determinable parameter using a calibrated frequency.

11. The method of claim 10 wherein a cross-checking the absolute calibration of the at least one determinable parameter using a calibrated frequency includes applying a microwave signal of known frequency to a body of the at least one qubit via a microwave line inductively coupled to the body of the at least one qubit.

12. The method of claim 10 wherein cross-checking the absolute calibration of the at least one determinable parameter using a calibrated frequency includes initializing the at least one qubit in one potential well; lowering a tunnel barrier of the at least one qubit via the programming interface to measure an oscillation frequency of the at least one qubit between two potential wells; and raising the tunnel barrier of the at least one qubit via the programming interface.

13. The method of claim 12 wherein lowering the tunnel barrier of the at least one qubit via the programming interface includes lowering the tunnel barrier of the at least one qubit via qubit annealing controls and raising the tunnel barrier of the at least one qubit via the programming interface includes raising the tunnel barrier of the at least one qubit via qubit annealing controls.

14. The method of claim 13 further comprising reading out a state of the at least one qubit.

* * * * *

UNITED STATES PATENT AND TRADEMARK OFFICE
CERTIFICATE OF CORRECTION

PATENT NO. : 11,182,230 B2
APPLICATION NO. : 16/702096
DATED : November 23, 2021
INVENTOR(S) : Andrew J. Berkley et al.

Page 1 of 1

It is certified that error appears in the above-identified patent and that said Letters Patent is hereby corrected as shown below:

In the Claims

Column 27, Line 12, Claim 4:
"device first value and the first device second values of"
Should read:
--device first value and the first device second value of--.

Column 27, Line 66, Claim 5:
"device first value and the first device second values of"
Should read:
--device first value and the first device second value of--.

Column 28, Line 6, Claim 5:
"device first value and the second device second values"
Should read:
--device first value and the second device second value--.

Signed and Sealed this
Thirtieth Day of August, 2022

Katherine Kelly Vidal
*Director of the United States Patent and Trademark Office*